US012209869B2

United States Patent
Xu et al.

(10) Patent No.: US 12,209,869 B2
(45) Date of Patent: Jan. 28, 2025

(54) VERIFYING RELIABILITY OF DATA USED FOR AUTONOMOUS DRIVING

(71) Applicant: Zoox, Inc., Foster City, CA (US)

(72) Inventors: Yi Xu, Pasadena, CA (US); Noureldin Ehab Hendy, West Lafayette, IN (US); Cooper Stokes Sloan, San Francisco, CA (US); Sarah Tariq, Palo Alto, CA (US); Feng Tian, Foster City, CA (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 175 days.

(21) Appl. No.: 17/227,002

(22) Filed: Apr. 9, 2021

(65) Prior Publication Data

US 2022/0326023 A1    Oct. 13, 2022

(51) Int. Cl.
| | | |
|---|---|---|
| G01C 21/30 | (2006.01) | |
| B60W 60/00 | (2020.01) | |
| G01C 21/00 | (2006.01) | |
| G06N 20/00 | (2019.01) | |

(52) U.S. Cl.
CPC .......... *G01C 21/30* (2013.01); *B60W 60/001* (2020.02); *G01C 21/3807* (2020.08); *G06N 20/00* (2019.01); *B60W 2420/403* (2013.01); *B60W 2420/408* (2024.01); *B60W 2552/53* (2020.02)

(58) Field of Classification Search
None
See application file for complete search history.

(56) References Cited

U.S. PATENT DOCUMENTS

| | | |
|---|---|---|
| 9,612,123 B1 | 4/2017 | Levinson et al. |
| 10,353,390 B2 | 7/2019 | Linscott et al. |
| 10,948,302 B2 * | 3/2021 | Kudrynski ............... G06T 7/50 |
| 11,354,913 B1 * | 6/2022 | Houston ................ G06F 18/24 |
| 2008/0106436 A1 | 5/2008 | Breed |

(Continued)

FOREIGN PATENT DOCUMENTS

| | | |
|---|---|---|
| CN | 110968094 | 4/2020 |
| EP | 3470789 | 4/2019 |

(Continued)

OTHER PUBLICATIONS

De Silva, et al., "Fusion of LiDAR and Camera Sensor Data for Environment Sensing in Driverless Vehicles", retrived from Google Scholar Aug. 15, 2022, 2017, 8 pgs.

(Continued)

*Primary Examiner* — Tuan C To
*Assistant Examiner* — David Ruben Pedersen
(74) *Attorney, Agent, or Firm* — Lee & Hayes, P.C.

(57) ABSTRACT

Techniques for verifying a reliability of map data are discussed herein. In some examples, map data can be used by a vehicle, such as an autonomous vehicle, to traverse an environment. Sensor data (e.g., image data, lidar data, etc.) can be received from a sensor associated with a vehicle and may be used to generate an estimated map and confidence values associated with the estimated map. When the sensor data is image data, images data from multiple perspectives or different time instances may be combined to generate the estimated map. The estimated map may be compared to a stored map or to a proposed vehicle trajectory or corridor to determine a reliability of the stored map data.

20 Claims, 6 Drawing Sheets

(56) References Cited

U.S. PATENT DOCUMENTS

| | | |
|---|---|---|
| 2009/0228204 A1 | 9/2009 | Zavoli |
| 2013/0278443 A1 | 10/2013 | Rubin et al. |
| 2018/0364734 A1 | 12/2018 | Ferguson |
| 2019/0033459 A1* | 1/2019 | Tisdale .................. G01S 7/497 |
| 2019/0213426 A1* | 7/2019 | Chen ....................... G06T 7/20 |
| 2019/0227545 A1* | 7/2019 | Yoo .................. B60W 50/0098 |
| 2019/0234745 A1* | 8/2019 | Lee .................. G01C 21/3881 |
| 2019/0332118 A1 | 10/2019 | Wang et al. |
| 2020/0082219 A1* | 3/2020 | Li ........................ G06V 20/56 |
| 2020/0110416 A1 | 4/2020 | Hong et al. |
| 2020/0175286 A1* | 6/2020 | Major .................... G06F 18/24 |
| 2020/0240790 A1 | 7/2020 | Behrendt et al. |
| 2021/0180959 A1 | 6/2021 | Muto |
| 2021/0331703 A1 | 10/2021 | Duan et al. |
| 2022/0092816 A1* | 3/2022 | Houts .................... G01S 17/89 |
| 2022/0269937 A1* | 8/2022 | Kim ....................... G06F 30/27 |
| 2023/0100014 A1 | 3/2023 | Duan |

FOREIGN PATENT DOCUMENTS

| | | |
|---|---|---|
| JP | 2008033439 | 2/2008 |
| JP | 2019185599 A | 10/2019 |
| JP | 2020038634 | 3/2020 |
| WO | WO2010006669 | 1/2010 |
| WO | WO2019073360 A1 | 4/2019 |

OTHER PUBLICATIONS

Office Action for U.S. Appl. No. 16/856,826, mailed Feb. 22, 2022, Duan, "Map Consistency Checker", 7 pages.
PCT Search Report and Written Opinion mailed Jul. 13, 2022 for PCT application No. PCT/US22/23415, 12 pages.
PCT Search Report and Written Opinion for PCT App No. PCT/US21/27484, dtd Jul. 22, 2021, 9 pages.
PCT International Preliminary Report on Patentability mailed Oct. 19, 2023 for PCT Application No. PCT/US22/023415, 8 pages.

* cited by examiner

VERIFYING RELIABILITY OF DATA USED FOR AUTONOMOUS DRIVING

BACKGROUND

Various methods, apparatuses, and systems are utilized by autonomous vehicles to guide such autonomous vehicles through environments, which may include various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. A variety of sensors may be used to collect information about objects in the surrounding environment, which may be used by the autonomous vehicle to make decisions on how to traverse the environment. Furthermore, in some examples, the autonomous vehicle may utilize maps of the surrounding environment for making decisions on how to traverse the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
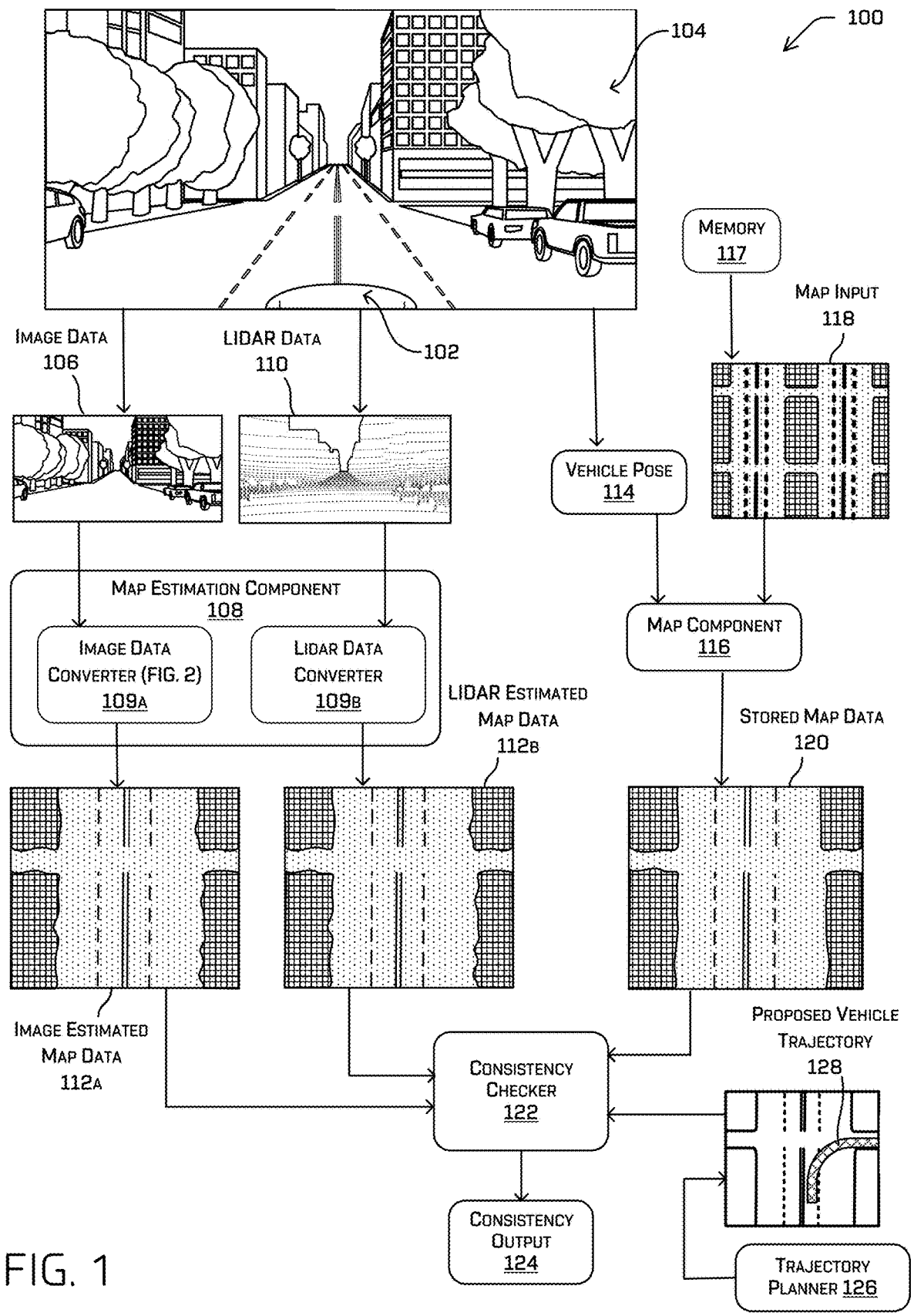
FIG. 1 illustrates an example pictorial flow of elements used for verifying the reliability of data used for autonomous driving.

Techniques for verifying a reliability of map data are discussed herein. In some cases, such map data may be used by a vehicle, such as an autonomous vehicle, to maneuver in an environment. That is, an autonomous vehicle may use various data when determining how to navigate through an environment, such as a stored map, a vehicle pose, and a planned trajectory. Subject matter of this disclosure may verify the reliability of such data in various ways. For example, the autonomous vehicle may utilize sensor data representing the environment to generate an estimated map of the environment. The autonomous vehicle may then compare the estimated map to data (e.g., stored map, planned trajectory, etc.) to determine whether the data is reliable. The autonomous vehicle may use the results of the comparison in various ways. For instance, the autonomous vehicle may proceed with using the data to navigate the environment, change vehicle operations (e.g., decelerate or apply brakes), or use the estimated map to navigate the environment.

Maps used by autonomous vehicles may be generated before the vehicle is in an environment and stored for subsequent retrieval and use when the vehicle is navigating the environment. These stored maps may include various information associated with the environment (e.g., indications of on-road portions, off-road portions, and lane markings), and using a pose of the vehicle, the vehicle may use a stored map to generate a planned trajectory (e.g., speed, steering angle, etc.) to navigate through the environment. In some instances, this data that may be used by the vehicle to plan maneuvers may be unreliable. For example, a perceived or sensed pose may not accurately reflect a position of the vehicle in the environment. In other instances, environments may change (e.g., emergent route changes, construction zones, ground condition changes, lanes being repainted, etc.), and a stored map may not be updated to reflect such changes. Both pose data and a stored map may be used to determine a planned trajectory, and if one of these is inaccurate, then the planned trajectory may chart a course that, if executed, inadvertently crosses elements in the environment (e.g., off-road areas, curbs, lane lines, etc.).

Subject matter of this disclosure may determine whether a stored map of an environment is reliable, which may increase the likelihood that the stored map accurately reflects the environment and that a trajectory planned based on the stored map charts a course across intended portions of the environment. For example, an estimated map may be generated using sensor data (e.g., image data, lidar data, etc.), and the estimated map may include various data. In some instances, the estimated map may include various information associated with, or indicating, elements of interest in the environment (e.g., semantic information indicating off-road areas, on-road areas, solid lane lines, dash lane lines, and the like). The estimated map may be compared to a stored map to determine consistency, and if the consistency is high enough, the stored map may be deemed reliable and/or data used to generate the stored map (e.g., vehicle pose) may be deemed reliable. Conversely, if a level of consistency between the stored map and the estimated map is below a threshold level, the stored map, or data used to generate the stored map data, may be determined to be unreliable.

In addition to verifying the reliability of a stored map, subject matter of this disclosure may verify the reliability of a planned trajectory, which is based on the stored map. For example, the estimated map with the semantic information may be compared to a planned trajectory (e.g., corridor) to determine whether the planned trajectory overlaps with areas of the estimated map that are not intended to be driven across (e.g., portions of the estimated map indicated by the semantic information as an off-road area or a solid lane line). If the amount of overlap is acceptable (e.g., below a threshold), then the planned trajectory may be deemed reliable. In other aspects, if overlap between the planned trajectory and portions of the map intended to be driven across is acceptable (e.g., above a threshold), then the planned trajectory may be deemed reliable.

In some aspects of the disclosure, multiple estimated maps may be generated to be compared to the stored map. For example, one estimated map may be generated based on image data, and another estimated map may be generated based on lidar data. Both the image estimated map and the lidar estimated map may be compared to the stored maps, which may provide multi-modal redundancy and multiple levels of consistency checking.

Subject matter of the present disclosure also applies various techniques to image data to improve usability with a machine learned model. For example, in one aspect, image data associated with different perspectives is combined into a single top-down representation, which may be used to generate an estimated map. In other aspects, image data from different instances in time may be motion-adjusted to orient the image data in a common coordinate system. That is, first image data may be associated with a first pose at a first time instant, while second image data may be associated with a second pose at a second time instant (e.g., 1 second later). Subject matter described in this disclosure may adjust the first image data and/or the second image data based on a difference between the first and second poses, so that respective maps generated from each image data have corresponding coordinates.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles in which such a component may provide an indication to a driver of the vehicle. In another example, the techniques can be utilized in an aviation or nautical context, or in any component involving objects or entities that may be associated with behavior that is unknown to the component. In some examples, the techniques can be utilized in contexts outside of autonomous vehicles. Furthermore, the techniques described herein can be used with real data (e.g., captured using sensor(s)), simulated data (e.g., generated by a simulator), or any combination of the two. Additionally, the subject matter of this disclosure may provide various advantages or benefits. For instance, in some cases, the techniques described may provide safer vehicle operation, such as by reducing the likelihood that a driving maneuver based on unreliable data is executed.

FIG. 1 illustrates an example pictorial flow 100 of elements for determining reliability of a stored map and/or a proposed vehicle trajectory based on one or more estimated maps. In at least one example, processes or steps depicted in the flow 100 may be performed by one or more computing devices onboard a vehicle 102, such as an autonomous vehicle, or by a remote computing device (e.g., server in a data center) that is accessible by the vehicle 102. In addition, the computing device(s) can include components for controlling the vehicle 102. Additional details associated with the vehicle 102 and the computing device(s) and/or component(s) associated therewith are described below with reference to FIG. 6.

In at least one example, the vehicle 102 may be associated with one or more sensor components. In at least one example, the sensor component(s) may capture data associated with an environment 104 surrounding the vehicle 102. In at least one example, the sensor component(s) may include lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. The sensor component(s) may generate sensor data, which may include, but is not limited to, lidar data, radar data, ultrasonic transducer data, sonar data, location data (e.g., global positioning component (GPS), compass, etc.), inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc.

In at least one example, cameras onboard the vehicle 102 may provide image data 106 (e.g., image(s) captured by camera(s)) to a map estimation component 108. In at least one example, the image data 106 may include images from various cameras that are disposed about the vehicle 102 to capture various angles of the environment 104 within which the vehicle 102 is positioned. For example, in at least one example, the camera data may include images from eight different cameras which can capture eight different portions of the environment 104.

In at least one example, lidar sensors onboard the vehicle 102 may provide lidar data 110 to the map estimation component 108. In at least one example, the lidar data 110 may be associated with point clouds in a grid (e.g., with designated dimensions such as 320×192). In at least one example, the lidar data may be associated with one or more features, which can include grid occupancy (e.g., a binary and/or probability a portion of the environment is occupied), grid density, maximum_z (max_z) (e.g., a highest lidar point on a z-axis of a multidimensional coordinate system), maximum_z divided into two or more bins (max_z divided into bins), minimum_z (min_z) (e.g., a lowest lidar point on the z-axis), intensity at minimum_z (min_z), etc.

Figure 2:
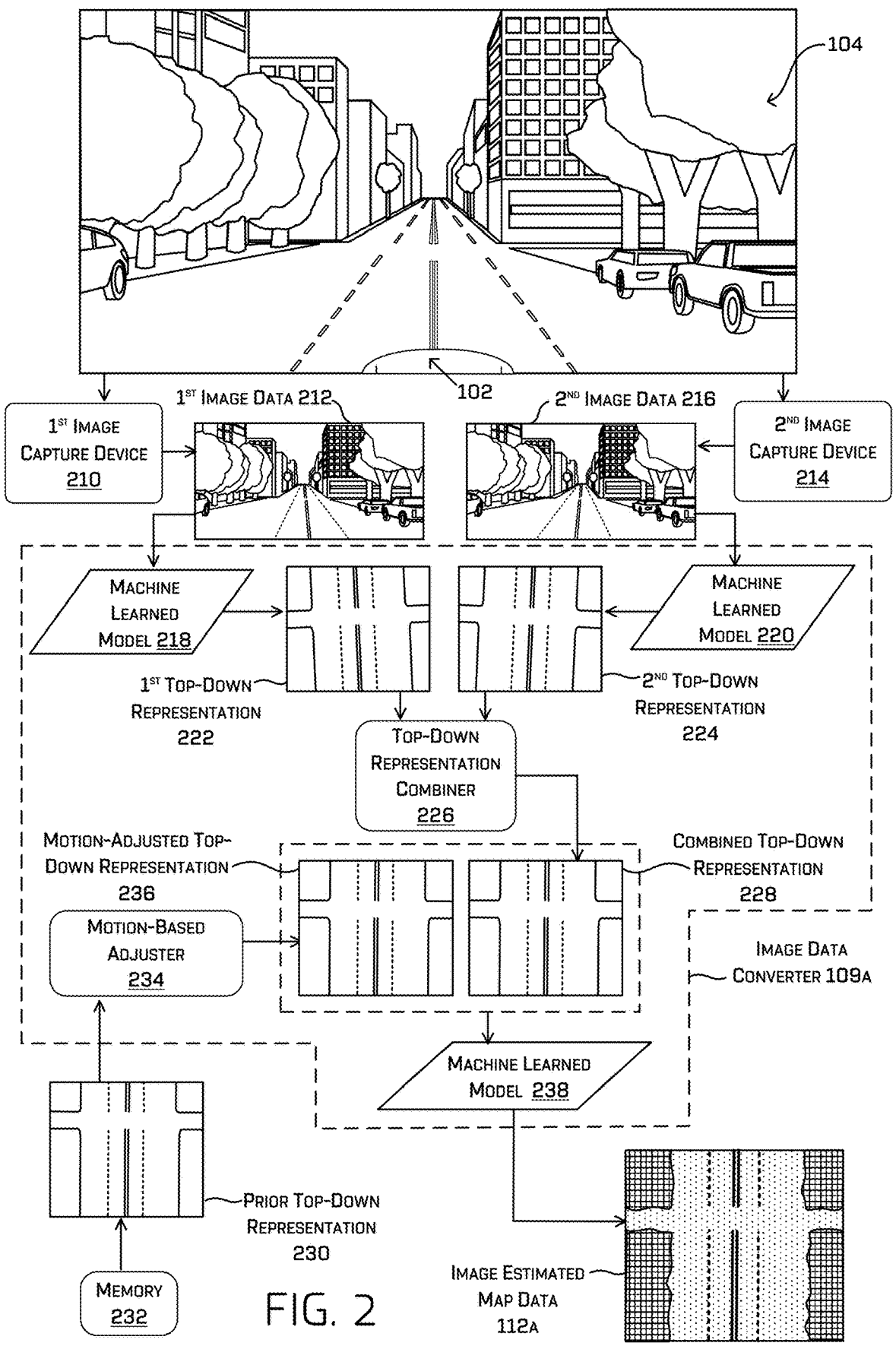
FIG. 2 illustrates example elements of an image data converter, which may use image data from multiple cameras to generate estimated map data.

The map estimation component 108 may include one or more components for processing the image data 106, the lidar data 110, and/or other sensor modalities associated with the sensor component(s) onboard the vehicle 102. In at least one example, the map estimation component 108 may include a map estimation component as described in U.S. application Ser. No. 16/856,826 (titled "Map Consistency Checker" and filed Apr. 23, 2020), which is incorporated herein by reference in its entirety and for all purposes. The map estimation component 108 may include an image data converter 109a that may receive the image data 106 and process the image data 106, for example, using one or more machine learned models (e.g., using one or more neural networks, such as a residual neural network, a fully connected neural network, or the like), one or more image processing techniques, a combination of the foregoing, or the like. Example elements of the image data converter 109a are depicted in FIG. 2, which will be described in more detail below. In addition, a lidar data converter 109b may receive the lidar data 110 and process the lidar data 110, for example, using one or more machine learned models (e.g., using a neural network, such as a residual neural network).

In one aspect, the image data converter 109a may generate an image feature representation based at least in part on the image data 106, where the image feature representation includes a top-down perspective (e.g., a top-down image representation). In an example, the image data converter 109a may receive the image data 106 and may resize each of the images to a designated size (e.g., height×width× channel width) conducive to subsequent processing, such as by inputting into a model. For example, a designated size may include 320×192×3, although any height, width, and number of channels may be used. The image data converter 109a may then process the resized images using one or more models. For example, the image data converter 109a may encode the resized images (e.g., using a neural network, such as a residual neural network) and use a fully connected neural network to convert images from a projection view to an orthogonal (e.g., top-down) view. Then, the image data converter 109a may decode the resized images (e.g., using a neural network, such as a residual neural network).

In examples, the image feature representation may be based on the image data 106 of the environment 104 captured by cameras disposed on the vehicle 102. In at least one example, the image data converter 109a may encode the resized images to generate image feature representations. An image feature representation can include indications of pedestrian(s) (which may also include information related to the type of object, and/or movement information associated with the pedestrian(s) embedded in the image feature representation at the location of the indication), vehicle(s) (which may also include information related to the respective vehicle(s) such as the type of object, and/or movement information associated with the respective vehicle(s) embedded in the image feature representation at the locations of the indications), and the like. Similarly, the image feature representation may be embedded with information regarding speed limits, lane lines, lane widths, lane ends, stop lines, traffic lights, traffic light states, and the like.

In at least one example, the image data converter 109a may include a machine learned model that, using an image-data top-down representation, may detect and label aspects of the environment 104, such as driving lanes, solid lane lines, dash lane lines, drivable surfaces (e.g., "on-road surfaces"), non-drivable surfaces (e.g., "off-road" surfaces), and the like. In some examples, a machine-trained model can output a mask associated with individual objects in the environment 104. The mask may be represented in plan view or from a top-down perspective (e.g., "top-down segmentation"). In one aspect, the image data converter 109a may label the resulting top-down image using a "top-down segmentation" algorithm as described in U.S. patent application Ser. No. 15/963,833, (titled "Data Segmentation Using Masks) and filed on Apr. 26, 2018), the contents of which are incorporated by reference herein in its entirety and for all purposes.

In another aspect, the image data converter 109a may output an image estimated map that is based on the image data 106. In at least one example, the image estimated map may include a top-down representation of the environment 104 surrounding the vehicle 102. In such an example, the image estimated map may be centered on the vehicle 102. Data encoded in the image estimated map may be referred to as "estimated map data" or "image estimated map 112a." Such data may encode information associated with the environment 104 in the estimated map, which can include, but is not limited to policy information pertaining to the rules of the road (e.g., driving lanes, lane lines, drivable surfaces/non-drivable surfaces, intersections, sidewalks, traffic flow indicators (e.g., traffic lights, speed limits, road signs, etc.), etc.). A non-limiting example of an estimated map and/or associated data is shown in FIG. 1, and such image estimated map data 112a may be used for checking the consistency of a stored maps and/or a proposed vehicle trajectory, as described below.

In a further aspect of the present disclosure, the lidar data converter 109b may generate a top-down representation of the environment 104 based at least in part on the lidar data 110. For instance, the lidar data converter 109b may accumulate features of objects in the environment 104 over a projected voxel area. The lidar data converter 109b may combine the accumulated features into voxel features, which represent the features in the three-dimensional space of the projected voxel area. In some examples, the lidar processing component may collapse the voxel features along the height dimension to generate orthographic (e.g., top-down) features. The orthographic features, therefore, represent dimensions and/or characteristics of an object in a two-dimensional plane from the three-dimensional voxel features. The lidar data converter 109b may provide the orthographic features of the object as part of a top-down representation of the environment 104. Additional details associated with generating top-down representations of lidar data in an environment, that can be supplemented with image features, as described above, are described in U.S. patent application Ser. No. 16/586,620 (titled "Supplementing Top-Down Predictions with Image Features" filed on Sep. 11, 2019), the entire contents of which are incorporated by reference herein in its entirety and for all purposes.

In another aspect, the lidar data converter 109b may output a lidar estimated map that is based at least in part on the lidar data 110. In at least one example, the lidar estimated map may include a top-down representation of the environment 104 surrounding the vehicle 102. In such an example, the lidar estimated map may be centered on the vehicle 102. Data encoded in the lidar estimated map may be referred to as "estimated map data" or "lidar estimated map 112b." Such data may encode information associated with the environment 104 in the estimated map, which can include, but is not limited to policy information pertaining to the rules of the road (e.g., driving lanes, lane lines, drivable surfaces/non-drivable surfaces, intersections, sidewalks, traffic flow indicators (e.g., traffic lights, speed limits, road signs, etc.), etc.). A non-limiting example of an estimated map and/or associated data is shown in FIG. 1, and such lidar estimated map data 112b may be used for checking the consistency of a stored maps and/or a proposed vehicle trajectory, as described below.

Although the image estimated map data 112a and the lidar estimated map data 112b are capable of including information of similar types and values, in some cases, the information embedded in the two different representations will be different. In at least one example, the map estimation component 108 may combine the data, which may include information from both the top-down representation and the image feature representation regarding object type, bounding boxes, movement information, and the like. In at least one example, an average can be computed based at least in part on the output (e.g., representation and/or image) associated with each modality (e.g., lidar and camera), and the average can be used as the estimated data output by the estimation component 108. Of course, any other method for combining the estimated maps is contemplated, including, but not limited to, use of Bayesian techniques. Furthermore, while two different components and/or models (e.g., neural networks) are described for processing the image data 106 and the lidar data 110, in an additional or alternative example, a single component and/or single model can be used to generate an estimated map. Moreover, while FIG. 1 refers to image data 106 and lidar data 110, any type of sensor data can be provided as an input for generating the estimated map.

As indicated above, both the image data converter 109a and the lidar data converter 109b may output encoded policy data pertaining to various elements of the environment 104, such as driving lanes, lane lines, drivable surfaces/non-drivable surfaces, intersections, sidewalks, traffic flow indicators (e.g., traffic lights, speed limits, road signs, etc.), and the like. In some instances, estimations related to the encoded policy data may be inaccurate due to occlusion, complicated road structure, etc. As such, the image data converter 109*a* and the lidar data converter 109*b* may also output confidence value data associated with respective estimated maps. For example, the image data converter 109*a* and the lidar data converter 109*b* may each include a machine learned model that includes both a classification head (e.g., for outputting segmentation data) and a confidence head (e.g., for outputting a per pixel confidence data). Both the segmentation data and the confidence data may be included in the image estimated map data 112*a* and the lidar estimated map data 112*b*.

In at least one example, the one or more computing devices onboard the vehicle 102 can include a localization component. The localization component can determine a pose (position and orientation) of the vehicle 102 in relation to a local and/or global map based at least in part on sensor data received from the sensor component(s) and/or map data associated with a map. In at least one example, the determined vehicle pose 114 may be input into a map component 116. Furthermore, a local and/or global map (e.g., representing the environment 104) may be obtained from memory 117 (e.g., remotely stored on onboard the vehicle 102), and the local and/or global map may be provided as map input 118 into the map component 116. In at least one example, the local and/or global map may be a "stored map" that has been generated, at least in part, by previous data collection efforts. In at least one example, the stored map can be a top-down representation of the environment 104 and can be encoded with information associated with the environment 104, which can include, but is not limited to policy information pertaining to the rules of the road (e.g., driving lanes, lane lines, drivable surfaces/non-drivable surfaces, intersections, sidewalks, traffic flow indicators (e.g., traffic lights, speed limits, road signs, etc.), etc.).

In at least one example, the map component 116 can utilize the vehicle pose 114 and the map input 118 to determine a portion of the environment 104 surrounding the vehicle 102. That is, the map component 116 may access the local and/or global map, and based at least in part on the vehicle pose 114, may determine a portion of the local and/or global map that is surrounding the vehicle 102. Data encoded in such a top-down representation can be called "stored map data" 120 (e.g., which is a sub-area of the map input 118). A non-limiting example of a stored map and/or associated data is shown in FIG. 1. Such stored map data 120 can be used for checking the consistency of the map input 118, or information derived therefrom, as described below. In addition, the stored map data 120 may be used to determine a proposed vehicle trajectory.

Another aspect of the present disclosure may include a trajectory planner 126, which may be either onboard the vehicle 102 or executed remotely and accessible by the vehicle via a network. The trajectory planner 126 may receive various inputs, such as estimated map data 112*a* and/or 112*b*, stored map data 120, data from other onboard sensors, charted-course data (e.g., from location A to location B), rules or policy data (e.g., do not cross off-road areas or solid lane lines), and the vehicle pose 114, and provide a proposed vehicle trajectory 128. For example, the trajectory planner 126 may execute a search algorithm (e.g., applying some heuristic(s) to assess cost) on a pose grid or graph to identify a proposed trajectory. In other instances, the trajectory planner 126 may include a machine learned model that receives various inputs and, based on being trained, outputs the proposed vehicle trajectory 128. The proposed vehicle trajectory 128 may chart a path or course for the vehicle 102 through the environment based on the input. The proposed vehicle trajectory 128 may include various information, such as trajectory corridor data including spatial data representing estimated vehicle positions based on the vehicle moving along the path. As used in this disclosure, a corridor may include a set of positions or coordinates that are estimated to overlap with a vehicle traversing along a given trajectory.

In at least one example, the estimated map data 112*a* and/or 112*b* is used to determine the reliability of the stored map data 120 and/or the proposed vehicle trajectory 128. For example, the image estimated map data 112*a*, the lidar estimated map data 112*b*, the stored map data 120, and the proposed vehicle trajectory 128 may be input to a consistency checker 122 (e.g., consistency checking component). The consistency checker 122 may provide a consistency output 124 that indicates whether data is reliable and that is consumable by downstream components as input for additional operations (e.g., proceed with trajectory, apply brakes, recalculate trajectory, obtain new pose, etc.).

The consistency checker 122 may compare the image estimated map data 112*a* to the stored map data 120 and to the proposed vehicle trajectory 128. For example, the image estimated map data 112*a* (e.g., including the confidence value data associated therewith) may be compared to the stored map data 120 to assess whether the data is consistent, and therefore reliable. In at least one example, the consistency checker 122 can utilize one or more consistency "checks" or evaluations to evaluate portions of the environment 104 (e.g., which can be associated with individual, corresponding pixels of the image estimated map data 112*a* and the stored map data 120). A low consistency (e.g., does not meet a threshold) may suggest that the stored map data 120 does not accurately reflect the environment 104, such as if the environment 104 has changed since the map input 118 was originally created. In other instances, a low consistency may indicate inaccurate pose data 114. A result of the comparison between the image estimated map data 112*a* and the stored map data 120 may be quantified as a consistency score, which may be provided as consistency output 124. The consistency checker 122 may perform a similar comparison between the lidar estimated map data 112*b* (e.g., including the confidence value data associated therewith) and the stored map data 120, which provides reliability verification redundancy across multiple sensor modalities. In some examples, an optical flow algorithm can be used to determine differences between the stored map and the estimated map data, which can be used to determine consistency.

In another example, the image estimated map data 112*a* (e.g., including the confidence value associated therewith) may be compared to the proposed vehicle trajectory 128 to determine whether the trajectory (e.g., points along the trajectory corridor) overlaps with semantically identified portions (e.g., semantic data of the estimated map data indicating off-road areas, lane lines, etc.). If the proposed vehicle trajectory 128 overlaps with certain semantically identified portions (e.g., indicating a trajectory interference) by a sufficient amount, then the proposed vehicle trajectory 128 may be deemed unreliable, which may indicate the stored map data 120 is not accurate, the vehicle pose 114 is not accurate, or other potential inaccurate perceptions relating to the environment 104. In some examples, an amount of overlap may be weighted or evaluated based at least in part on the confidence values associated with the overlapping portions. A result of the comparison between the image estimated map data 112*a* and the proposed vehicle trajectory 128 may be quantified as an overlap score, which may be provided as consistency output 124. The consistency checker 122 may perform a similar comparison between the lidar estimated map data 112*b* (e.g., including the confidence value data associated therewith) and the proposed vehicle trajectory 128, which provides reliability verification redundancy across multiple sensor modalities.

In at least one example, the consistency checking component 122 can output consistency scores, overlap scores, and confidence ratings (e.g., quantifying the reliability of the stored map data 120) associated with one or more checks. For example, based at least in part on comparing the estimated map data 112*a*/112*b* with the stored map data 120, the consistency checker 122 can output a confidence rating indicating whether a trajectory associated with the vehicle 102 (e.g., along which the vehicle 102 is to drive) is estimated to be on a drivable surface of the estimated map, a confidence score indicating that the trajectory will cross a lane line, a confidence score indicating that a pose of the vehicle 102 is reliable, and/or a confidence score indicating that information associated with the stored map is reliable. Additional details associated with each of the confidence scores are described below with reference to FIG. 3. In some examples, the confidence scores can be associated with indications of sources of inconsistencies. Such confidence scores and/or associated indications can comprise and/or can be used to determine "consistency output" 124.

In at least one example, the consistency output 124 (e.g., consistency score and/or overlap score) may be provided to one or more down-stream components of the vehicle 102 for making decisions on how to traverse the environment 104. That is, the consistency output 124 may be monitored, and the vehicle 102 (e.g., computing device(s) associated therewith) may use the consistency output 124 to determine how to control the vehicle 102. In at least one example, if the consistency output 124 indicates that the stored map data 120 is not consistent with the estimated map data 112*a*/112*b*, the computing device(s) associated with the vehicle 102 may cause the vehicle 102 to perform a maneuver (e.g., decelerate, stop, avoid less reliable mapped portions, maneuver in mapped portions of higher confidence, etc.). In some examples, the vehicle 102 may decelerate and travel at a velocity below a threshold until the inconsistency is resolved (e.g., confidence score(s) meet or exceed respective threshold(s)). In some examples, when a consistency score is below a threshold the vehicle may send a request for instructions to a remote computing device (e.g., associated with teleoperators). Furthermore, in at least one example, if the consistency output 124 indicates that the stored map data 120 is not consistent with the estimated map data 112*a*/112*b*, the computing device(s) associated with the vehicle 102 can determine to use the estimated map data instead of the stored map, at least until the inconsistency is resolved. Moreover, if the consistency output 124 indicates an inconsistency or lower reliability, then a remapping of the area may be initiated, such as by using different sensors, different mapping techniques, different perception approaches, more sophisticated sensors, higher fidelity data, and the like. Further still, map information may be temporally weighted for consideration by subsequent processes (e.g., more recent map data is weighted higher). In an additional or alternative example, the vehicle 102 may alter a planned trajectory to include regions of high consistency (e.g., confidence score (s) that meet or exceed respective threshold(s)) and avoid regions of low consistency (e.g., confidence score(s) below respective threshold(s)). That is, the confidence score(s) can be input into a planner component, described below in association with FIG. 6, for use in determining and/or modifying a trajectory along which the vehicle 102 can travel.

The elements depicted in FIG. 1 may have various components that contribute to operations, such as to determining accurate estimated map data 112*a* or 112*b* and providing valuable consistency output 124 (e.g., consistency scores and overlap scores). For instance, referring now to FIG. 2, some additional components of the image data converter 109*a*, in accordance with at least one example, are depicted in more detail. FIG. 2 depicts the vehicle 102 in the environment 104. In addition, the vehicle includes a first image capture device 210 providing first image data 212 from a first perspective (e.g., from left side of the vehicle 102) and a second image capture device 214 providing second image data 216 from a second perspective (e.g., from right side of the vehicle 102). In accordance with one aspect of the disclosure, the first image data 212 and the second image data 216 are associated with a time (e.g., an instant in time when the vehicle is in a position within the environment). In addition, the first image data 212 and the second image data 216 are provided to the image data converter 109*a* to be used to generate the image estimated map data 112*a*.

The first image data 212 and the second image data 216 may be processed in various ways to generate the image estimated map data 112*a*. In one aspect of the disclosure, the first image data 212 and the second image data 216 are each input into a respective machine learned model 218 and 220. Each of the machine learned models 218 and 220 may encode the respective image data 212 and 216 (e.g., using a neural network, such as a residual neural network) and use a fully connected neural network to convert the image data from a projection view (as represented in FIG. 2 as the first image data 212 and the second image data 216) to a feature vector or map (e.g., high dimensional feature vector). The feature vector output provided by the models 218 and 220 may include data that represent, indicates, or is usable to generate an orthogonal view or top-down representation. For pictorial purposes in depicting the subject matter of FIG. 2, FIG. 2 depicts a first top-down representation 222 determined from the first image data 212 and a second top-down representation 224 from the second image data 216, and the feature vector output provided by each of the models 218 and 220 may actually be less human intelligible in some examples.

As indicated above, the first image data 212 is from the first perspective (e.g., from left side of the vehicle 102), and the second image data 216 is from the second perspective (e.g., from right side of the vehicle 102). As such, the first top-down representation 222 and the second top-down representation 224 may be misaligned relative to one another (e.g., rotated). In accordance with one aspect of this disclosure, the first top-down representation 222 (e.g., the high dimensional feature vector from the model 218) and the second top-down representation 224 (e.g., the high dimensional feature vector from the model 220) are provided as input to a top-down representation combiner 226. Among other things, the top-down representation combiner 226 may combine or add the data associated with each of the first top-down representation 222 and the second top-down representation 224, and adjust the combined data to align with (e.g., be consistent with) a spatial reference (e.g., coordinate (s)) associated with the stored map data 120. In addition, the top-down representation combiner 226 may decode the data and output a combined top-down representation 228 (e.g., using a neural network, such as a residual neural network). Similar to the top-down representations 222 and 224, the combined top-down representation 228 is depicted for pictorial purposes, and in some instances the output from the top-down representation combiner 226 may be a feature vector that is less human intelligible than the pictorial representation in FIG. 2.

The combined top-down representation 228 may be associated with a time instance (t) at which the first image data 212 and the second image data 216 were recorded. In addition, the vehicle 102 may be associated with a pose associated with the time instance t. In some cases, combining the top-down representation 228 with additional top-down representations from other time instances t−n (e.g., 0.5 seconds prior, 1.0 seconds prior, 1.5 seconds prior, etc.) may provide a more robust data set to be used to generate image estimated map data 112a. As such, one aspect of the present disclosure includes obtaining a prior top-down representation 230, such as from memory 232 (e.g., cache). The prior top-down representation 230 may be a top-down representation generated from image data recorded at a single time instance (e.g., t−0.5 seconds). In addition, the prior top-down representation 230 may include a combination of top-down representations from multiple time instance (e.g., t−0.5; t−1.0; and t−1.5).

Often, the vehicle 102 may move from the prior time instance (t−n) to the time instant (t). In other words, a first pose associated with the time instant (t) is different from a second pose associated with the prior time instance (t−n). As such, in an aspect of the disclosure, the prior top-down representation 230 is motion adjusted, based on a difference between the first pose and the second pose, to be aligned with a spatial reference (e.g., coordinate(s)) associated with the combined top-down representation 228 and/or with the stored map data 120. For example, the prior top-down representation 230 may be provided as input to a motion-based adjuster 234, which may translate and rotate the data (e.g., feature map) of the prior top-down representation 230 (based on a difference in poses from (t−n) to (t)) to generate and provide a motion-adjusted top-down representation 236 considering the difference between the poses. Similar to the top-down representations 222, 224, and 228, the depiction in FIG. 2 of the prior top-down representation 230 and the motion-adjusted top-down representation 236 is provided for pictorial purposes, and in some examples, the data of the prior top-down representation 230 and the motion-adjusted top-down representation 236 may include a feature vector, including data from a single prior time instant or from multiple combined prior time instances. Furthermore, the motion-adjusted top-down representation 238 may be multiple motion-adjusted top-down representations (e.g., four representations) from different prior time instances (e.g., t−0.5; t−1.0; t−1.5, and t−2.0). For example, a prior top-down representation 230 from t−0.5 may be provided to the motion-based adjuster 234, which may apply a respective transformation based on a difference in poses between t and t−0.5, and another prior top-down representation 230 from t−1.0 may also be provided to the motion-based adjuster 234, which may apply a respective transformation based on a difference in poses between t and t−1.0. Similar respective transformations may be executed on the prior top-down representations for each of t−1.5 and t−2.0, and each of the transformed or motion-adjusted top-down representations may be provided at 238. In some instances, the rotation or translation may not align, in which case a bilinear interpolation may be performed. As indicated above, including the prior, motion-adjusted data may provide a more robust data set and yield more accurate estimated map data 112a from the model.

In a further aspect of the disclosure, the image data converter 109a may use both the combined top-down representation 228 and the motion-adjusted top-down representation(s) 236 to determine image estimated map data 112a and confidence value data associated therewith. For example, the combined top-down representation 228 and the motion-adjusted top-down representation 236 may be provided as input to a machine learned model 238 (e.g., convolutional neural network), which may concatenate the top-down representations 228 and 236 and generate the estimated map data 112a. The machine learned model 238 may have multiple layers (e.g., channels or features), such as an off-road channel, an on-road channel, a solid lane-line channel, and a dash lane-line channel, which may be used to generate output segmentation (e.g., per pixel characterization or pixel-wise softmax). For example, the machine learned model 238 may associate each pixel with a feature and feature score (e.g., off-road−0.8).

In a further aspect, the machine learned model 238 may also include a confidence head that outputs a per pixel confidence. That is, in some instances, image sensor data (e.g., 212 and 216) may be subject to elements that reduce a confidence in perception. For example, a field of view may be at least partially blocked; a lens may be dirty; an object (e.g., vehicle) may block a view of an element (e.g., curb, lane line, shoulder, etc.); and the like. As such, in one example, a confidence head (e.g., trained model) of the model 238 may operate in parallel with the segmentation channels and output a per pixel confidence for each layer of the segmentation output. In other aspects of the disclosure, one or more other methods may be used to estimate confidence. For example, a lidar occupancy map (e.g., occlusion map) could be provided as an input. Alternatively, the model could simply take the max score across all channels (e.g., lower max score suggesting a lower confidence and higher max scores suggesting a higher confidence). As described in other portions of this disclosure, the image estimated map data 112a (e.g., including the confidence data) may be used to verify the reliability of stored map data 120 and/or a proposed vehicle trajectory 128.

Figure 3:
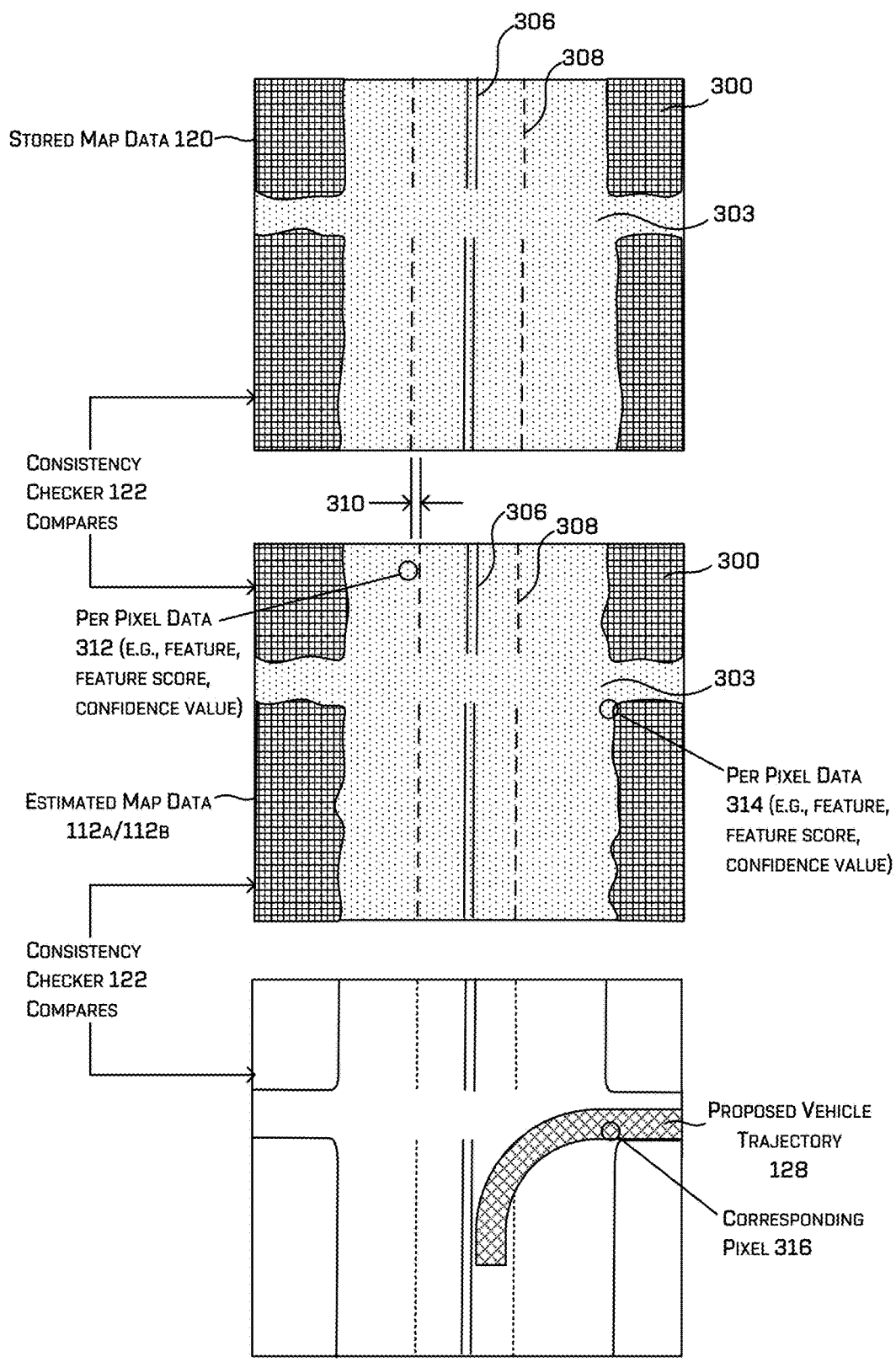
FIG. 3 illustrates an example of estimated map data, which may be compared to stored map data and a proposed vehicle trajectory.

Referring now to FIG. 3, FIG. 3 illustrates an example of the estimated map data 112a or 112b, which may be compared to the stored map data 120 and/or the proposed vehicle trajectory 128. Both the estimated map data 112a/112b and the stored map data 120 are multi-channel top-down representations (multi-channel top-down image data) of the environment 104 surrounding a vehicle 102. As illustrated, both the estimated map data 112a/112b and the stored map data 120 may include labels (e.g., masks) that indicate portions of the environment 104 that are associated with an "off-road" indicator 300, indicating that the corresponding portion of the environment 104 is associated with a surface that is not drivable, and an "on-road" indicator 302, indicating that the corresponding portion of the environment 104 is associated with a drivable surface. Furthermore, lane lines, marking driving lanes are also depicted. For example, solid lane lines 306 are shown in both the estimated map data 112 and the stored map data 120, as well as dash lane lines 308. In a further aspect of the disclosure, the estimated map data 112a/112b may include per pixel data 312 and 314 associated with pixels of the estimated map data 112a/112b. Per pixel data may include data output by the machine learned model 238 (e.g., by the segmentation head and the confidence head), such as a feature identifier (e.g., off-road, on-road, solid lane line, dash lane line); a feature score associated with the feature identifier (e.g., off-road–0.8); and a confidence value.

Furthermore, while on-road indicators, off-road indicators, solid lane lines, and dash lane lines are shown in FIG. 3, in additional or alternative examples, the maps can include additional or alternative map data, which can comprise map elements such lane markings, lane boundaries, one or more lane references (e.g., illustrating a centerline associated with a lane and/or a route between available (e.g., legal) lanes). Additional examples of map elements can include, but are not limited to, one or more of a lane element, a bike lane element, a crosswalk element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like. In addition, the estimated map data 112a and 112b and the stored map data 120 can include other information encoded in each of the maps, as described above. In at least one example, the map elements described above can comprise at least a portion of the "policy information" described above.

As illustrated, when compared, the estimated map data 112 and the stored map data 120 are inconsistent. That is, the lane lines in the estimated map data 112 are displaced by an amount 310 from the dashed lines that represent the lane lines in the stored map data 120. This inconsistency could result from various factors. For example, the lane lines may having been repainted at some time after the stored map was updated or the stored map data 120 may be based on inaccurate pose data attributable to a localization error. In some examples, the displacement (e.g., difference) may meet or exceed a threshold and in such an example, the consistency output 124 can indicate an inconsistency. For example, a threshold may include x pixels (e.g., 5 pixels), such that a displacement amount 310 of more than x pixels suggests lower reliability, whereas a displacement amount 310 of x pixels or less may be deemed to not reduce the reliability of stored map data or information used to generate stored map data. As such, one or more down-stream components can make decisions on how to traverse the environment 104 based at least in part on the determined inconsistency.

The consistency output 124 may be generated in various manners. For example, in an aspect of the disclosure, a comparison between the estimated map data 112a/112b and the stored map data 120 is based on an optical flow algorithm (e.g., Lucas-Kanada method), which may be used to evaluate segmentation consistency as between the estimated map data 112a/112b and the stored map data 120. In at least one example, the consistency checker 122 can compare a first map element (e.g., a lane line) in the estimated map data 112a/112b with a second map element (e.g., a lane line), that corresponds to a same feature or channel, in the stored map data 120. The consistency checker 122 can determine a difference or other displacement between the first map element and the second map element, and if the difference or other displacement meets or exceeds a threshold, the consistency checker 122 can determine an inconsistency between the stored map data 120 and the estimated map data 112a/112b. In at least one example, the difference and/or other displacement can be determined based at least in part on any extent of the map element (e.g., x, y, yaw). The consistency checker 122 may compare each channel of the estimated map data 112a/112b with a corresponding channel of the stored map data 120. The consistency data across multiple channels may be aggregated and compared to a threshold value, and/or each channel may be considered separately and compared to a per-channel threshold value.

As an example, for determining lane line consistency, the consistency checking component 122 can subtract dilated input associated with lane lines as indicated in the stored map data 120 with input associated with lane lines as indicated in the estimated map data 112a/112b to generate line segments that can be perceived in the real world but are not present in the stored map data 120. In some examples, pixels associated with residual lines can be weighted by inverse their distance to the vehicle (e.g., because estimation may be better near the vehicle than farther away from the vehicle). In at least one example, if a connected component is associated with a weight that meets or exceeds a threshold, consistency checker 122 can determine an inconsistency between the stored map data 120 and the estimated map data 112a/112b and provide a corresponding consistency output 124.

In one aspect of the disclosure, the optical flow algorithm provides a per-frame x-drift score quantifying an offset in the x-axis for the entire frame (as opposed to per pixel) and a per-frame y-drift score quantifying an offset in the y-axis for the entire frame. As such, consistency may be based on both the per-frame x-drift score and the per-frame y-drift score. That is, a lower confidence value for a frame may be output if either the per-frame x-drift score or the per-frame y-drift score is above a threshold. Furthermore, an per-frame x-drift score or a per-frame y-drift score that is above a threshold (e.g. indicating a larger offset) may be used to infer a localization error.

In another aspect, an optical flow algorithm may be executed by the consistency checker 122 and may consider one or more of the segmentation channels in various manners. For example, in one aspect of the disclosure, the optical flow algorithm estimates the drift with all channels (e.g., off-road, on-road, solid lane line, and dash lane line), which is combined with the estimated drift for only pixels associated with lane lines (e.g., solid and dash). In another example, the per pixel confidence value output by the confidence head is used as a weight in the optical flow algorithm. For example, the optical flow algorithm may include $$\begin{bmatrix} V_x \\ V_y \end{bmatrix} = \begin{bmatrix} \Sigma_i w_i I_x(q_i)^2 & \Sigma_i w_i I_x(q_i) I_y(q_i) \\ \Sigma_i w_i I_x(q_i) I_y(q_i) & \Sigma_i w_i I_y(q_i)^2 \end{bmatrix}^{-1} \begin{bmatrix} -\Sigma_i w_i I_x(q_i) I_t(q_i) \\ -\Sigma_i w_i I_y(q_i) I_t(q_i) \end{bmatrix}$$

where $w_i$ is the confidence value (e.g., in data 314) output by the confidence head.

In at least one example, the consistency checker 122 can compare pose information associated with the vehicle 102. For instance, in at least one example, the estimated map data 112a/112b may represent a region of the environment 104 centered on the vehicle 102 and the stored map data 120 may represent a region of the environment centered on the vehicle 102 based on pose information 114 of the vehicle 102. The consistency checker 122 may compare the estimated map data 112a/112b and the stored map data 120 to determine whether the stored map is consistent with the estimated map, and thus whether the pose information associated with the vehicle 102 (e.g., vehicle pose 114) is reliable. In at least one example, the consistency checking component 122 can use a Kanade-Lucas-Tomasi (KLT)

feature tracking algorithm to determine a displacement between the stored map data 120 and the estimated map data 112a/112b. For example, the consistency checking component 122 can estimate pose displacement by assuming that there is Δx displacement from the first pose estimation $I_{est}(x)$ to input I(x), namely, $I_{est}(x)=I(x+\Delta x).$ As such, the solution to said problem can be modeled as follows:

$$\Delta x = \left(\Sigma \frac{\partial I}{\partial x}(x) \frac{\partial I}{\partial x}(x)^T\right)^{-1} \left[\Sigma (I_{est}(x) - I(x)) \frac{\partial I}{\partial x}(x)\right].$$

In at least one example, consistency checker 122 can compare the displacement (e.g., Δx) with a threshold to determine whether the displacement meets or exceeds the threshold. In at least one example, if the displacement meets or exceeds a threshold, the consistency checker 122 can determine an inconsistency between the stored map data and the estimated map data. While a displacement with respect to "x" is described, displacement can be determined for any extent of the pose (e.g., x, y, yaw, etc.). Furthermore, in some examples, another difference can be determined for checking consistency of pose information. In some examples where the displacement meets or exceeds a second threshold (which may, in some examples, be the same as the threshold above), the map consistency check may not be implemented, as it may be indicative of an error in localization and may not correspond to an error in mapping.

In some examples, the consistency checker 122 can determine a confidence score (e.g., as part of the consistency output 124) indicating whether a pose of the vehicle 102 is reliable, based at least in part on the displacement. For instance, in at least one example, the larger the displacement, the lower the confidence score may be, and vice versa. In other examples, the consistency checker 122 can determine a confidence score (e.g., as part of confidence output 124) indicating whether information (e.g., policy data) associated with the stored map is reliable. In some examples, the confidence output 124 can be based at least in part on the difference and/or other displacement. For instance, in at least one example, the larger the difference and/or other displacement, the lower the confidence output 124 may be, and vice versa. In some examples, the confidence output 124 can be based at least in part on a weight associated with a map element. In at least one example, if the confidence output 124 meets or exceeds a threshold, an inconsistency may be determined between the stored map data 120 and the estimated map data 112a/112b.

FIG. 3 also depicts the proposed vehicle trajectory, which may also be compared to the estimated map data 112a/112b to determine whether the proposed vehicle trajectory 128 is reliable. In one aspect of the disclosure, the consistency checker 122 compares an overlap between the proposed vehicle trajectory 128 (e.g., corridor data) and the estimated map data 112a/112b. For example, data associated with corresponding pixels may be compared (between the proposed vehicle trajectory 128 and the estimated map data 112a/112b) to determine whether pixels of the proposed vehicle trajectory 128 overlap with trajectory interferences (e.g., estimated elements of the environment 104 not desired to be driven across, such as off-road portions and solid lane lines). An overlap score may be generated as a result of the comparison and provided as part of the consistency output 124. In some instances, the consistency checker 122 may search for overlaps with trajectory interferences (e.g., off road areas or solid lane lines), in which case the overlap score may indicate whether there is some estimated overlap with any trajectory interference. In one example, the overlap score may include a combination (e.g., sum) along the proposed vehicle trajectory 128. For example, pixels of the proposed trajectory 128 that overlap with a trajectory interference may be identified, such as by comparing pixel to pixel and identifying overlapping pixels of the estimated map having a high enough trajectory-interference feature score (e.g., off-road feature score above some threshold). The value of each pixel (e.g., feature score×confidence value) that overlaps and that is associated with a trajectory interference may be combined (e.g., summed) to determine an overlap score (e.g., provided as part of the consistency output 124) for the proposed vehicle trajectory 128. The summed overlap score may be used to determine the reliability of the proposed vehicle trajectory 128. For example, if the summed overlap score is below a threshold, the proposed vehicle trajectory 128 may be deemed reliable, whereas a summed overlap score above a threshold may indicate an unreliable proposed vehicle trajectory. A determination of an unreliable proposed vehicle trajectory may indicate the stored map data 120 does not accurately reflect the environment 104, the vehicle pose 114 (e.g., used to generate the proposed vehicle trajectory 128) is inaccurate, an issue with the trajectory planner 126, and the like.

FIGS. 1, 2, and 3 collectively describe that the consistency checker 122 may provide or output one or more different determinations. In one example, the consistency checker 122 determines whether the localization is correct (e.g., by assessing a per-frame x-drift score and/or a per-frame y-drift score generated from an optical flow algorithm comparing estimated map data to stored map data). In addition, the consistency checker 122 may determine a safety or advisability of proceeding with a proposed trajectory. For example, the consistency checker 122 may determine whether a proposed trajectory (e.g., one or more pixels of a corridor) overlaps with an off-road portion (e.g., 300), overlaps with a solid lane line (e.g., 306), overlaps with a dotted lane line (e.g., 308), or any combination thereof. As explained above, each of these (e.g., optical flow algorithm output and overlap scores may take into account the confidence value provided by the confidence head of the model 238).

Various machine learned models are described in FIGS. 1, 2, and 3, and the machine learned models may be trained to perform various operations using various techniques. For example, one or more machine learned models may be included in the image data converter 109a, the lidar data converter 109b, the map component 116, the consistency checker 122, and the trajectory planner 126. A single model may be trained having multiple output heads associated with one or more modalities. In any case, a known portion of a policy map (top-down encoding of policies, such as lane markings, drivable surfaces, street directions, etc., as described herein) associated with corresponding sensor data may be utilized as a "ground truth." In such examples, sensor data from one or more of the sensor modalities (lidar, camera, radar, etc.) may be introduced to the model and compared against the corresponding policy map for determining losses for backpropagation. In at least some examples, such losses may be weighted based on the differing channels used as inputs to the various models.

In at least one example, a model may be trained using machine learning techniques. Machine learning algorithms that can be used to for training the model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Residual Neural Network (Resnet), fully connected neural networks, Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc.

In at least one example, a model (e.g., as part of the consistency checker 122) may be trained for determining inconsistencies between stored map(s) and estimated map(s). In at least one example, perception data (e.g., data determined by a perception component of a vehicle) as ground truth. In at least one example, the perception data can be converted into a top-down representation of an environment surrounding vehicle using techniques described above. The model(s) may be trained based on the perception data and input data, which can include lidar features (e.g., top down lidar occupancy, normalized lidar density, maximum_z (max_z), maximum_z divided into portions (max_z over n portions), etc.) and vision features (e.g., configurable set of input cameras, configurable downsample resolution, etc.) that are temporarily aggregated at a frequency (e.g., 10 hertz) for a configurable number of frames. In at least one example, sample inputs can be provided to verify a sensitivity of the model. Such sample inputs can include variations of vehicle pose (e.g., x, y, and yaw) or map data that indicates changes to environments (e.g., events for lane repainting, sidewalk changes, stop sign labelling (wrong), etc.). In at least one example, the model can analyze the sample inputs and generate outputs.

In one aspect of the disclosure, a machine learned model of the image data converter 109a and a machine learned model of the lidar data converter 109b may be trained using batches. For example, batches may be organized into groups of training input data. In one aspect of the disclosure, the batches are balanced based on geographic regions of an area. For example, a city may be divided into relatively uniform (e.g., size, shape, etc.) regions, generating relatively uniform samples of each region, which may be grouped into a batch. Each batch (e.g., with relatively uniform samples from a respective region) may then be used to train the model. In other aspects, batches may be balanced or organized based on vehicle orientation. For example, training image data (e.g., from log data) may be grouped into batches based on similar vehicle orientation.

In another aspect of the disclosure, synthetic perturbations may be applied to training image data or training lidar data to create a more robust input data set. For example, the training lidar data may be synthetically rotated to more robustly train against vehicle rotation within the environment.

In one aspect of the disclosure (as described above in association with FIG. 3), the optical flow algorithm (e.g., used to compare image estimated map data 112a to stored map data 120 and to compare lidar estimated map data 112b to stored map data 120) may be used to estimate the drift with all channels (e.g., off-road, on-road, solid lane line, and dash lane line), which is combined with the estimated drift for only pixels associated with lane lines (e.g., solid and dash). As such, an aspect of the present disclosure may apply a customized loss function to train the consistency checker 122 when comparing the model output (e.g., image estimated map data or lidar estimated map data) to the ground truth (e.g., stored map data 120). For example, the loss function may consider the all class entropy across all classes or channels, as well as the cross entropy loss for just the lane lines (e.g., both solid lane lines and dash lane lines). In addition, in one example, the model is trained using estimated map data including multiple top-down representations (e.g., multiple feature vectors), such as multiple prior top-down representations. As such, in one aspect, the cross entropy loss may be across or based on multiple top-down representations (e.g., from two different time instances).

In a further example, the map estimation component 108 (e.g., the image data converter 109a and the lidar data converter 109b) is trained to output a confidence value (e.g., as part of per pixel data 312 and 314) in association with generating the estimated map data 112a and 112b. For example, the machine learned model 238 may include both a classification head for outputting segmentation (e.g., off-road, on-road, solid lane line, and dash lane line) and a confidence head for outputting a confidence score. The confidence head may be trained by comparing output estimated map data to a ground truth (e.g., the stored map data 120) to output a per pixel binary classification (e.g., 1 if corresponding pixels are consistent and 0 if corresponding pixels are not consistent). The per pixel binary classification may then be input back into the model as a loss.

Figure 4:
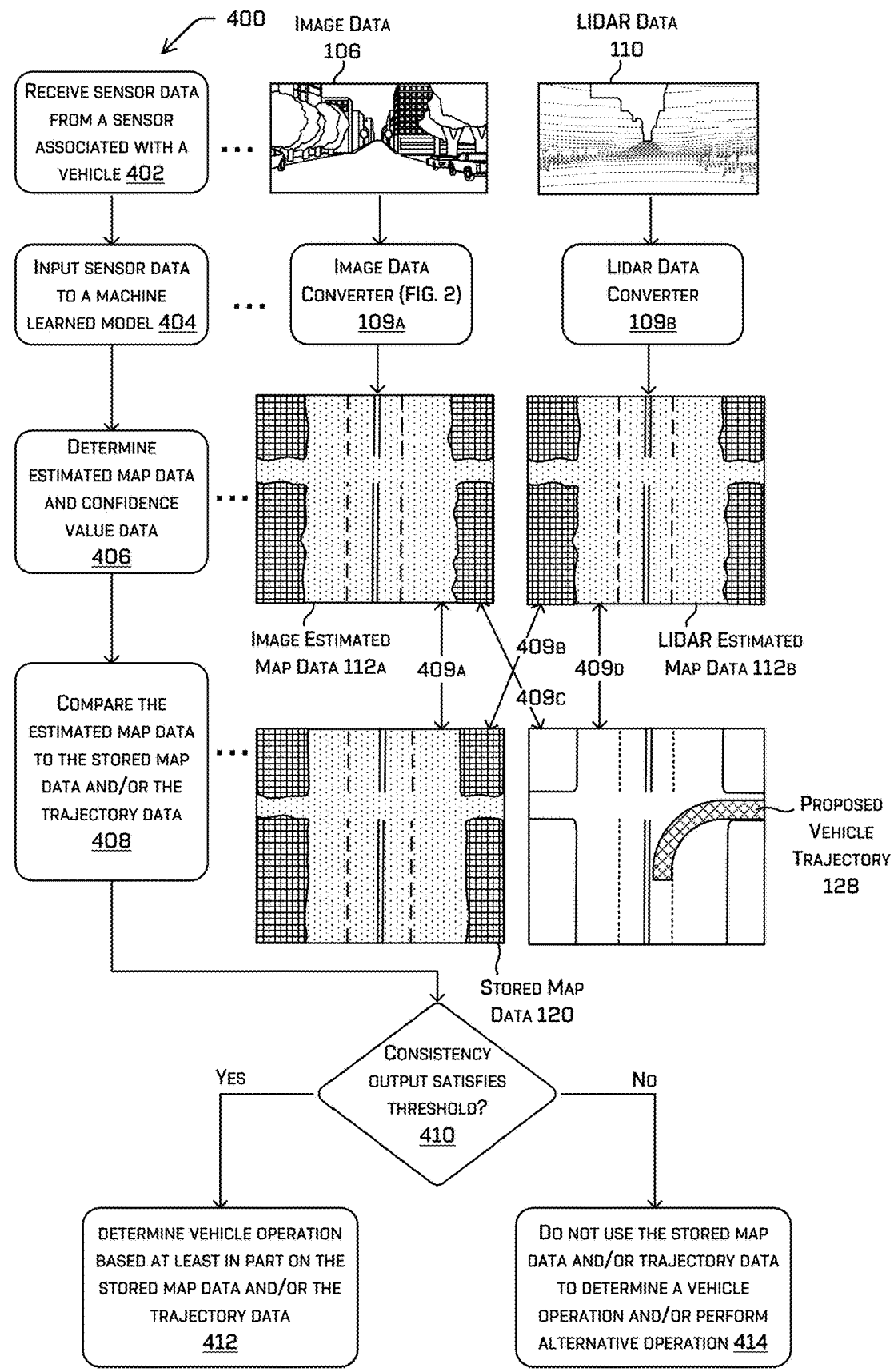
FIG. 4 illustrates an example process for generating an estimated map based on sensor data, as described herein.
Figure 5:
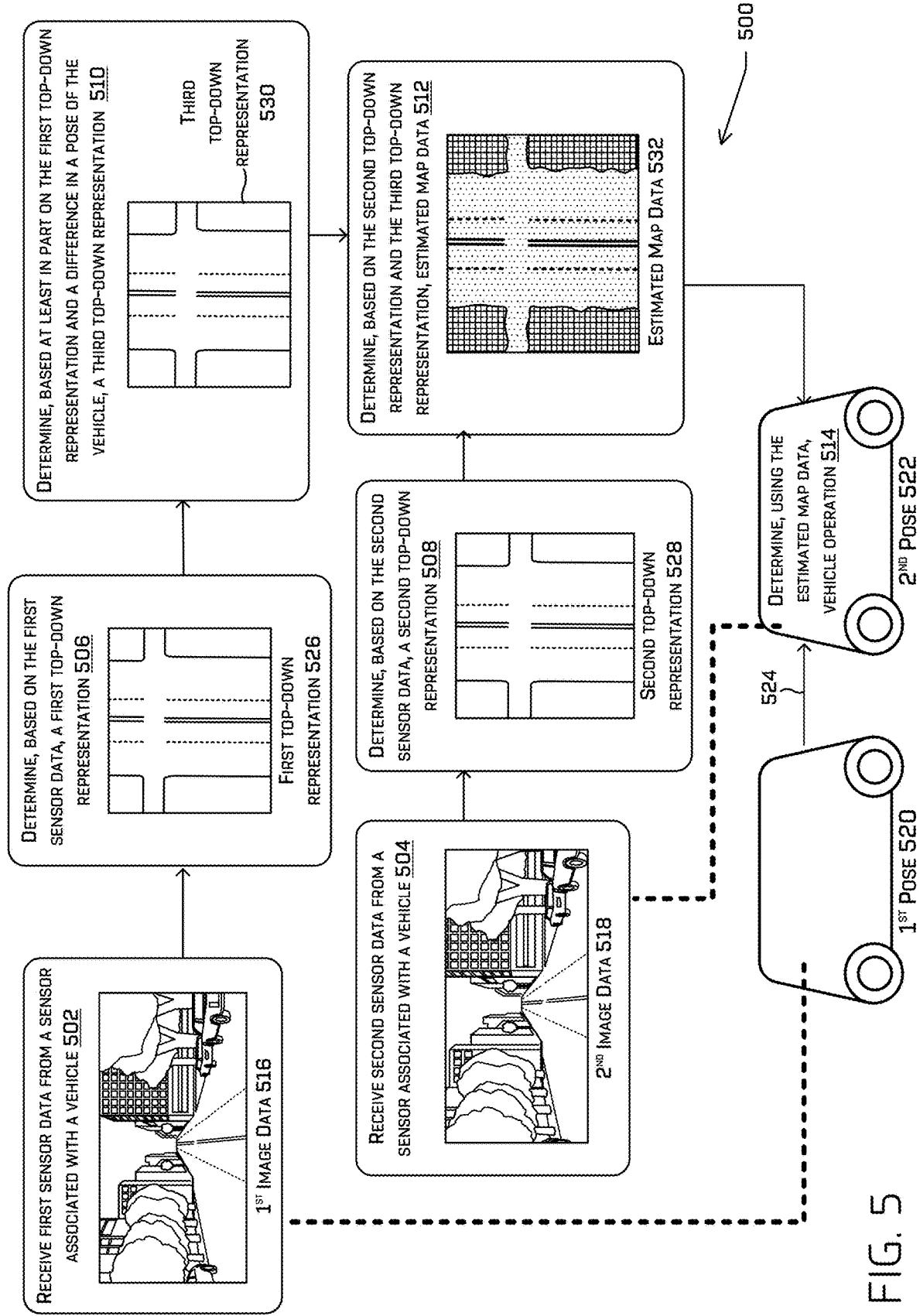
FIG. 5 illustrates an example process for generating an estimated map based on image data, as described herein.

FIGS. 4 and 5 are flowcharts showing example processes involving techniques as described herein. The processes illustrated in FIGS. 4 and 5 may be described with reference to components and elements described above with reference to FIGS. 1, 2, and 3 for convenience and ease of understanding. However, the processes illustrated in FIGS. 4 and 5 are not limited to being performed using these components, and the components are not limited to performing the processes illustrated in FIGS. 4 and 5.

FIG. 4 depicts a method 400 for determining a reliability of map data and determining a vehicle operation. The method 400 includes, at operation 402, receiving sensor data from a sensor associated with a vehicle. For example, image data 106 may be received from one or more cameras associated with a vehicle 102 in an environment 104, and/or lidar data 110 may be received from one or more lidar sensors associated with the vehicle 102 in the environment 104.

At operation 404, the method 400 includes inputting the sensor data into a machine learned model. For example, the image data 106 may be input into the image data converter 109a, and/or the lidar data 110 may be input into the lidar data converter 109b.

The method includes, at operation 406, determining estimated map data and confidence value data. For example, the machine learned model may determine image estimated map data 112a and/or lidar estimated map data 112b using a segmentation head and determine confidence value data using a confidence head. In one aspect, the estimated map data represents the environment 104 from a top-down representation.

In a further example, the method 400 includes, at operation 408, comparing the estimated map data to the stored map data and/or to the trajectory data. For example, the stored map data 120 may be received (e.g., from the map component 116) and compared 409a to the image estimated map data 112a and/or compared 409b to the lidar estimated map data 112b. In addition (or alternatively), the trajectory data (e.g., trajectory corridor data) may be received (e.g., from the trajectory planner 126) and compared 406c to the image estimated map data 112 and/or compared 409d to the lidar estimated map data 112b.

The method 400 may include determining an operation of a vehicle (e.g., the vehicle 102) based at least in part on the comparison from the operation 408. For example, at operation 410, a consistency output (e.g., consistency output 124 including a consistency score and/or an overlap score) resulting from the comparison in 408 may be compared to a threshold. If the threshold is satisfied, then at operation 412, a vehicle operation may be determined based at least in part on the stored map data and/or the trajectory data. Alternatively, if the consistency output does not satisfy the threshold, then at operation 414, the stored map data and/or trajectory data may not be used to determine a vehicle operation. Instead, the image estimated map data 112a and/or the lidar estimated map data 112b may be used to determine a vehicle operation, an alternative maneuver may be performed (e.g., brakes may be activated, accelerator or throttle input may be decreased, area(s) of lower reliability is avoided, route changed to area(s) of higher reliability, etc.), and the like. In other examples, at 414, a remapping of the area may be initiated, such as by using different sensors, different mapping techniques, different perception approaches, more sophisticated sensors, higher fidelity data, and the like Referring to FIG. 5, FIG. 5 depicts a method 500 for determining image estimated map data. The method includes, at operation 502, receiving first sensor data from at least one sensor associated with a vehicle in an environment. The method 500 includes, at operation 504, receiving second sensor data from at least one sensor associated with the vehicle in the environment. For example, in FIG. 5, first image data 516 and second sensor image data 518 may be received from at least one sensor associated with the vehicle 102 in an environment. The first image data 516 may be associated with a first pose 520, and the second image data 518 may be associated with a second pose 522 (e.g., after executing a maneuver 524). The first position and the second position may be different, which may result in the first sensor data (e.g., first image data 516) and the second sensor data (e.g., second image data 518) including different data (e.g., representing the environment differently). For example, the second image data 518 represents a vehicle position that is relatively further along a trajectory as compared with a vehicle position represented by the first image data 516 (e.g., the position in the second image data is further on down the road based on the position and size of other vehicles, trees, and buildings and closer to an intersection).

The method 500 includes, at operation 506, determining, based at least in part on the first sensor data, a first top-down representation of the environment. For example, the image data converter 109a may generate a first top-down representation based 526 (e.g., high dimensional feature vector) at least in part on the first image data 516, and the first top-down representation may be a "prior" top-down representation (e.g., prior top-down representation 230), based on the first time being prior to the second time.

The method 500 also includes, at operation 508, determining, based at least in part on the second sensor data, a second top-down representation of the environment. For example, the image data converter 109a may generate a second top-down representation based 528 (e.g., combined top-down representation 228 including a feature vector) based at least in part on the second image data 518.

In a further example, at operation 510 the method 500 includes determining, based at least in part on the first top-down representation and a difference in a pose of the vehicle between the first pose and the second pose, a third top-down representation of the environment. For example, based on the first top-down representation 526 and on a difference between the first pose 520 and the second pose 522, a third top-down representation 530 may be generated (e.g., by the motion-based adjuster 234). In one aspect, a translation and rotation are applied to the first top-down representation 526 (e.g., feature vector map) to generate the third top-down representation 530, which may also be bilinearly interpolated for alignment.

The method 500 includes, at operation 512, determining, based on the second top-down representation and the third top-down representation, estimated map data. For example, the machine learned model 238 may determine estimated map data 532 based on the second top-down representation 528 and the third top-down representation 530.

In an additional example, the method 500 includes, at operation 514, determining, using the estimated map data, an operation of the vehicle. For example, the estimated map data 532 may be compared to stored map data and/or trajectory data to assess a reliability and determine whether to traverse along a proposed trajectory.

Figure 6:
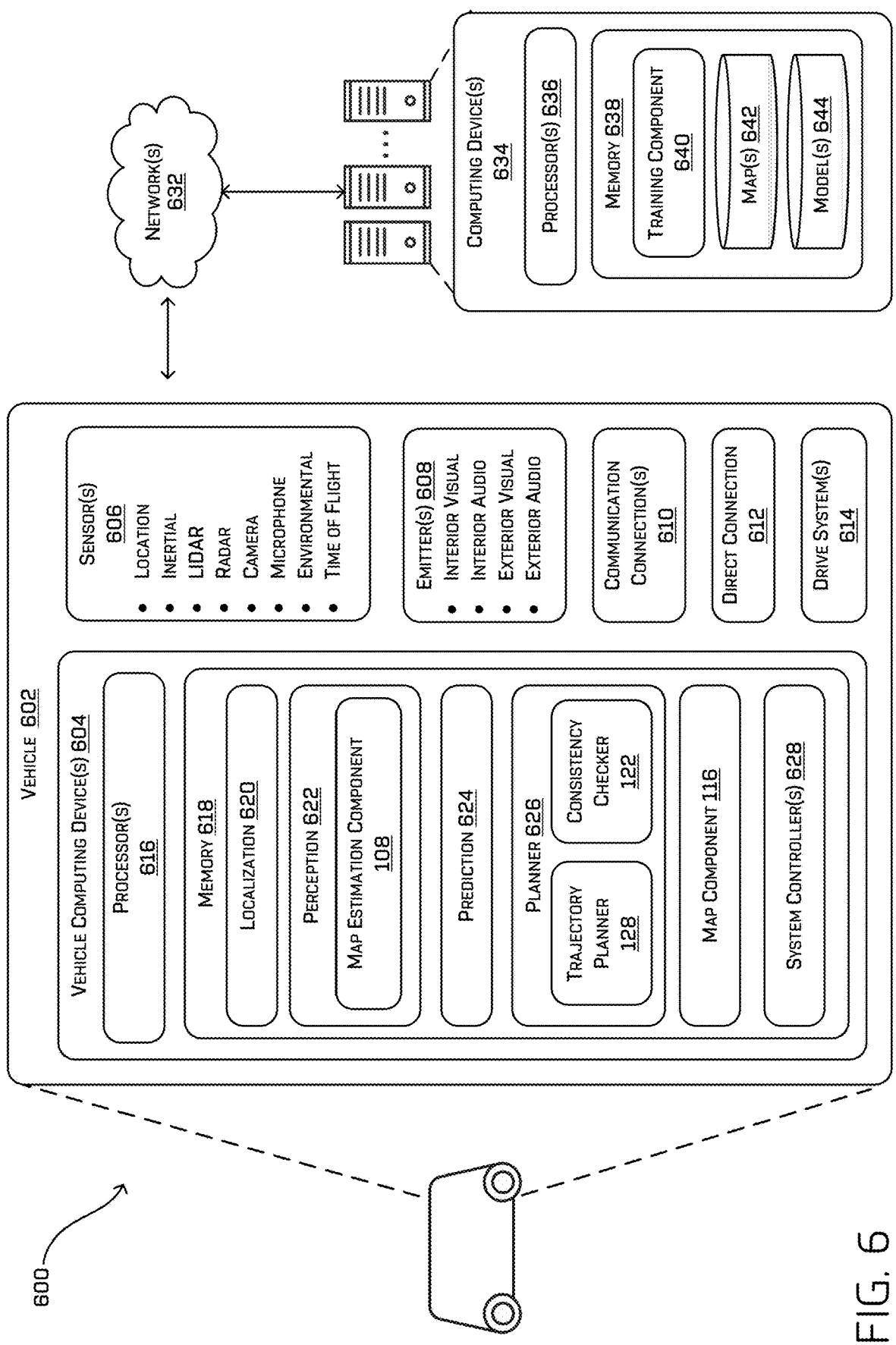
FIG. 6 is a block diagram illustrating an example system for performing techniques as described herein.

FIG. 6 is a block diagram illustrating an example system 600 for performing techniques as described herein.

In at least one example, a vehicle 602, which can correspond to the vehicle 102 described above with reference to FIG. 1, can include one or more vehicle computing devices 604, one or more sensor systems 606, one or more emitters 608, one or more communication connections 610, at least one direct connection 612, and one or more drive systems 614. In at least one example, a vehicle 602 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 602 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 602 is an autonomous vehicle; however, the vehicle 602 could be any other type of vehicle. While only a single vehicle 602 is illustrated in FIG. 6, in a practical application, the example system 600 can include a plurality of vehicles, which, in some examples, can comprise a fleet of vehicles.

The vehicle computing device(s) 604 can include processor(s) 616 and memory 618 communicatively coupled with the processor(s) 616. In the illustrated example, the memory 618 of the vehicle computing device(s) 604 stores a localization component 620, a perception component 622, a prediction component 624, a planner component 626, the map component 116, and one or more system controllers 628. The map component 116 may store (or retrieve from storage) map(s), model(s), previous outputs, etc. A map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments. The stored maps referred to herein can correspond to at least some of the maps stored by the map component 116. Model(s) can include machine-trained models, as described below. In some examples, the map component 116 can store previous outputs.

In at least one example and as described above, the localization component 620 can determine a pose (position and orientation) of the vehicle 602 in relation to a local and/or global map based at least in part on sensor data received from the sensor component(s) 606 and/or map data associated with a map (e.g., of the map(s)). In at least one example, the localization component 620 can include, or be associated with, a calibration component that is capable of performing operations for calibrating (determining various intrinsic and extrinsic parameters associated with any one or more of the sensor component(s) 606), localizing, and mapping substantially simultaneously.

In at least one example, the perception component 622 can perform object detection, segmentation, and/or classification based at least in part on sensor data received from the sensor component(s) 606. In at least one example, the perception component 622 can receive raw sensor data (e.g., from the sensor component(s) 606). In at least one example, the perception component 622 can receive sensor data and can utilize one or more processing algorithms to perform object detection, segmentation, and/or classification with respect to object(s) identified in the sensor data. In some examples, the perception component 622 can associate a bounding region (or otherwise an instance segmentation) with an identified object and can associate a confidence score associated with a classification of the identified object with the identified object. In some examples, objects, when rendered via a display, can be colored based on their perceived class. In some examples, the perception component 622 may include the map estimation component 108.

The prediction component 624 can receive sensor data from the sensor component(s) 606, map data associated with a map (e.g., of the map(s) which can be in storage 330), and/or perception data output from the perception component 622 (e.g., processed sensor data), and can output predictions associated with one or more objects within the environment of the vehicle 602. In at least one example, the planner component 626 can determine outputs, to use to control the vehicle 602 based at least in part on sensor data received from the sensor component(s) 606, map data, and/or any determinations made by the other components of the vehicle 602.

The planner component 626 may receive data, information, and/or outputs from the localization component 620, the perception component 622, the prediction component 624, and the map component 116 and may generate one or more proposed vehicle operations (e.g., proposed trajectories). In one example, the planner component 626 may include the trajectory planner 128 and the consistency checker 122. In other examples, the consistency checker 122 may be part of the map component 116 or an independent component. Additional details of localization components, perception components, prediction components, and/or planner components that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein in their entirety and for all purposes. In some examples (e.g., where the vehicle 602 is not an autonomous vehicle), one or more of the aforementioned components can be omitted from the vehicle 602.

The consistency checker 122 can receive estimated map data from the map estimation component 108 and can compare estimated map(s) with stored map(s) (e.g., from the map component 116) to monitor the accuracy of the stored map(s), as described above with reference to FIGS. 1, 3, and 4. As described above, in at least one example, the consistency checker 122 can be independent from other components onboard vehicle 602 that estimate pose (e.g., the localization component 620). Consistency output, as described above, can be monitored by the planner component 626. That is, techniques described herein relate to independently-performed, redundant techniques for monitoring consistency between stored maps and estimated maps to ensure that other components onboard the vehicle 602 (e.g., the planner component 626, etc.) can safely rely on the stored maps and/or information derived therefrom to make decisions.

While the components described above are illustrated as "onboard" the vehicle 602, in other implementations, the components can be remotely located and/or accessible to the vehicle 602. Furthermore, while the components are described above as "components," such components can comprise one or more components, which can be part of a system, for performing operations attributed to each of the components.

In at least one example, the localization component 620, the perception component 622, the prediction component 624, the planner component 626, the map estimation component 108, the consistency checker 122, etc. can process sensor data, as described above, and can send their respective outputs over network(s) 632, to computing device(s) 634. In at least one example, the localization component 620, the perception component 622, the prediction component 624, the planner component 626, the map estimation component 108, and/or the consistency checker 122 can send their respective outputs to the computing device(s) 634 at a particular frequency, after a lapse of a predetermined period of time, in near real-time, etc.

In at least one example, the vehicle computing device(s) 604 can include one or more system controllers 628, which can be configured to control steering, propulsion, braking, safety, emitters, communication, and other systems of the vehicle 602. These system controller(s) 628 can communicate with and/or control corresponding systems of the drive system(s) 614 and/or other systems of the vehicle 602.

In at least one example, the sensor component(s) 606 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor component(s) 606 can provide input to the vehicle computing device(s) 304. In some examples, the sensor component(s) 606 can preprocess at least some of the sensor data prior to sending the sensor data to the vehicle computing device(s) 604. In at least one example, the sensor component(s) 606 can send sensor data, via the network(s) 632, to the computing device(s) 634 at a particular frequency, after a lapse of a predetermined period of time, in near real-time, etc.

The vehicle 602 can also include one or more emitters 608 for emitting light and/or sound, as described above. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 608 can be positioned at various locations about the exterior and/or interior of the vehicle 602.

The vehicle 602 can also include communication connection(s) 610 that enable communication between the vehicle 602 and other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 632. For example, the communications connection(s) 610 can enable Wi-Fi-based communication such as via frequencies defined by the IEEE 802.11 standards, short range wireless frequencies such as BLUETOOTH or any suitable wired or wireless communications protocol that enables the respective computing device to interface with the other computing device(s).

The direct connection 612 can directly connect the drive system(s) 614 and other systems of the vehicle 602.

In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include sensor component(s) to detect conditions of the drive system(s) 614 and/or the surroundings of the vehicle 602. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 614. In some cases, the sensor component(s) on the drive system(s) 614 can overlap or supplement corresponding systems of the vehicle 602 (e.g., sensor component(s) 606).

The drive system(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 614. Furthermore, the drive system(s) 614 also include communication connection(s) that enable communication by the respective drive system with other local or remote computing device(s).

In FIG. 6, the vehicle computing device(s) 604, sensor component(s) 606, emitter(s) 608, and the communication connection(s) 610 are shown onboard the vehicle 602. However, in some examples, the vehicle computing device(s) 604, sensor component(s) 606, emitter(s) 608, and the communication connection(s) 610 can be implemented outside of an actual vehicle (i.e., not onboard the vehicle 602).

As described above, the vehicle 602 can send sensor data to the computing device(s) 634, via the network(s) 632. In some examples, the vehicle 602 can send raw sensor data to the computing device(s) 634. In other examples, the vehicle 602 can send processed sensor data and/or representations of sensor data to the computing device(s) 634 (e.g., data output from the localization component 620, the perception component 622, the prediction component 624, the planner component 626, the map estimation component 108, and/or the consistency checker 122). In some examples, the vehicle 602 can send sensor data to the computing device(s) 634 at a particular frequency, after a lapse of a predetermined period of time, in near real-time, etc.

The computing device(s) 634 can receive the sensor data (raw or processed) from the vehicle 602 and/or other data collection devices, as well as data from one or more third party sources and/or systems. In at least one example, the computing device(s) 634 can include processor(s) 636 and memory 638 communicatively coupled with the processor(s) 636. In the illustrated example, the memory 638 of the computing device(s) 634 stores a training component 640, a map(s) storage 642 (e.g., storing one or more maps), and a model(s) storage 644 (e.g., models output by the training component 640). In some examples, one or more of the systems and/or storage repositories can be associated with the vehicle 602 or other computing device(s) associated with the system 600 instead of, or in addition to, being associated with the memory 638 of the computing device(s) 634.

In at least one example, the training component 640 can train model(s) based at least in part on training data, which can be used for various operations as described herein. For example, the training component 640 can train model(s) used by the map estimation component 108, the map component 116, the consistency checker 122, the localization component 620, the perception component 622, the prediction component 624, the planner component 626, and the like. In at least one example, the resulting model(s) can be stored in the model(s) storage 644 and/or the storage 630 on the vehicle 602 and can be accessed in near real-time by one or more components of the vehicle computing device(s) 604.

In at least some examples, the training component 640 may train a model for each sensor modality individually. In several examples, a single model may be trained having multiple output heads associated with one or more modalities. In any case, a known portion of a policy map (top-down encoding of policies, such as lane markings, drivable surfaces, street directions, etc., as described herein) associated with corresponding sensor data may be utilized as a "ground truth." In such examples, sensor data from one or more of the sensor modalities (lidar, camera, radar, etc.) may be introduced to the model and compared against the corresponding policy map for determining losses for backpropagation. In at least some examples, such losses may be weighted based on the differing channels used as inputs to the various models.

In at least one example, the training component 640 can train model(s) using machine learning techniques. Machine learning algorithms that can be used to for training the model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Residual Neural Network (Resnet), fully connected neural networks, Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc.

In at least one example, the training component 640 can train a model for determining inconsistencies between stored map(s) and estimated map(s). That is, the training component 640 can train the model(s) used by the consistency checker 122, as described above with reference to FIG. 1. In at least one example, the training component 640 can use perception data (e.g., data determined by the perception component 622) as ground truth. In at least one example, the perception data can be converted into a top-down representation of an environment surrounding vehicle using techniques described above. The training component 640 can train the model(s) based on the perception data and input data, which can include lidar features (e.g., top down lidar occupancy, normalized lidar density, maximum_z (max_z), maximum_z divided into portions (max_z over n portions), etc.) and vision features (e.g., configurable set of input cameras, configurable downsample resolution, etc.) that are temporarily aggregated at a frequency (e.g., 10 hertz) for a configurable number of frames. In at least one example, sample inputs can be provided to the training component 640 to verify a sensitivity of the model. Such sample inputs can include variations of vehicle pose (e.g., x, y, and yaw) or map data that indicates changes to environments (e.g., events for lane repainting, side walk changes, stop sign labelling (wrong), etc.). In at least one example, the model can analyze the sample inputs and generate outputs.

The processor(s) 616 of the vehicle 602 and the processor(s) 636 of the computing device(s) 634 can be any suitable processor capable of executing instructions to process data and perform operations as described herein. By way of example and not limitation, the processor(s) 616 and 636 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 638 are examples of non-transitory computer-readable media. Memory 618 and 638 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in some examples, components of the vehicle 602 can be associated with the computing device(s) 634 and/or the components of the computing device(s) 634 can be associated with the vehicle 602. That is, the vehicle 602 can perform one or more of the functions associated with the computing device(s) 634, and vice versa.

Furthermore, while the vehicle computing device(s) 604 and the computing device(s) 634 are shown to include multiple components, in some examples, such components can be associated with more or fewer individual components. For example, in an example, a localization component, a perception component, a prediction component, and/or a planner component can be combined into a single component. Or, an annotation component, a training data generation component, and/or a training component can be combined into a single component. That is, while depicted as separate components, any one or more of the components can be combined.

As described above with reference to FIGS. 1-6, techniques described herein can be useful for monitoring stored maps to ensure such stored maps and/or information derived therefrom is reliable. That is, environments can change, and in some examples, stored maps may not be updated to reflect such changes. If a stored map is not accurate, an autonomous vehicle relying on such a stored map can make decisions that may not be safe. As an example, if a stored map shows that a portion of an environment is a drivable surface (e.g., associated with an "on-road" indication) when the portion of the environment is not a drivable surface, the autonomous vehicle can end up driving on a surface that is not actually drivable. As another example, if a stored map shows a driving lane in a particular position and the driving lane has been repainted or otherwise is in a different position, the autonomous vehicle can end up driving in multiple lanes unintentionally.

As such, it is imperative that stored maps are reliable so that autonomous vehicles can make decisions while traversing an environment to ensure safety for passengers and surrounding persons and objects. Techniques described above with reference to FIGS. 1-6 avail methods, apparatuses, and systems to enable determining whether a stored map of an environment is reliable, by comparing the stored map to an estimated map generated based at least in part on sensor data received in near real-time from sensor component(s) onboard a vehicle, such as an autonomous vehicle. As described above, techniques described herein can be performed by a consistency checker 122 that is independent from other components onboard the vehicle 602 that estimate pose (e.g., the localization component 620). Such techniques can utilize different sensor modalities (e.g., camera and lidar) to offer redundancy in making monitoring decisions. As such, techniques described herein relate to independently-performed, redundant techniques for monitoring consistency between stored maps and estimated maps to ensure that other components onboard the vehicle 602 (e.g., the planner component 626, etc.) can safely rely on the stored maps and/or information derived therefrom to make decisions.

Example Clauses

A. A system comprising: one or more processors; and one or more non-transitory computer-readable media storing instructions executable by the one or more processors, wherein the instructions, when executed, cause the system to perform operations comprising: receiving sensor data from a sensor associated with a vehicle in an environment, the sensor data comprising image data and lidar data; inputting the sensor data to a machine learned model; determining, by the machine learned model, estimated map data representing the environment from a top-down perspective and confidence value data associated with the estimated map data, the estimated map data comprising image estimated map data and lidar estimated map data; receiving at least one of stored map data or trajectory corridor data determined based at least in part on the stored map data; comparing, as a comparison, the estimated map data to at least one of the stored map data or the trajectory corridor data; and controlling an operation of the vehicle based at least in part on the comparison and the confidence value data.

B. The system of paragraph A, wherein the sensor data is first image data associated with a first time, and wherein determining the estimated map data comprises: determining, based on the first image data, a first top-down representation of the environment; determining, based at least in part on second image data of the environment associated with a second time, a second top-down representation of the environment; determining, based at least in part on the second top-down representation and a difference in a pose of the vehicle between the first time and the second time, a third top-down representation of the environment; and determining the estimated map data based on the first top-down representation and the third top-down representation.

C. The system of paragraph A or B, wherein: receiving at least one of the stored map data or the trajectory corridor data comprises receiving the stored map data; the comparison is based at least in part on an optical flow algorithm; and the operations further comprise determining a localization error based at least in part on the comparison.

D. The system of any of paragraphs A-C, wherein: receiving at least one of the stored map data or the trajectory corridor data comprises receiving the trajectory corridor data; and the comparison comprises determining an overlap score between a location associated with the estimated map data and a corresponding location associated with the trajectory corridor data.

E. The system of paragraph D, wherein the overlap score is further based at least in part on the confidence value data.

F. A method comprising: receiving sensor data from a sensor associated with a vehicle in an environment; inputting the sensor data to a machine learned model; receiving, from the machine learned model, estimated map data representing a top-down representation of the environment and confidence value data associated with the estimated map data; receiving at least one of stored map data or trajectory data determined based at least in part on the stored map data; comparing, as a comparison, the estimated map data to at least one of the stored map data or the trajectory data; and determining an operation of the vehicle based at least in part on the comparison.

G. The method of paragraph F, wherein the sensor data is first image data associated with a first time, and wherein determining the estimated map data comprises: determining, based on the first image data, a first top-down representation of the environment; determining, based at least in part on second image data of the environment associated with a second time, a second top-down representation of the environment; determining, based at least in part on the second top-down representation and a difference in a pose of the vehicle between the first time and the second time, a third top-down representation of the environment; and determining the estimated map data based on the first top-down representation and the third top-down representation.

H. The method of paragraph F or G, wherein: receiving at least one of the stored map data or the trajectory data comprises receiving the stored map data; the comparison is based at least in part on an optical flow algorithm; and the method further comprises determining a localization error based at least in part on the comparison.

I. The method of any of paragraphs F-H, wherein: receiving at least one of the stored map data or the trajectory data comprises receiving the trajectory data; and the comparison comprises determining an overlap score between a location associated with the estimated map data and a corresponding location associated with the trajectory data.

J. The method of paragraph I, wherein the overlap score is further based at least in part on the confidence value data, which includes a per-pixel confidence value associated with the location.

K. The method of paragraph I or J, wherein the location associated with the estimated map data comprises at least one of off-road data, on-road data, solid lane-line data, or dash lane-line data.

L. The method of any of paragraphs I-K, wherein the overlap score is a first overlap score; and wherein the comparison comprises: determining a second overlap score between a second location associated with the estimated map data and a corresponding second location associated with the trajectory data, and combining the first overlap score and the second overlap score.

M. The method of any of paragraphs F-L, wherein the sensor data is first image data representing a first perspective of the environment at a first time; wherein the method further comprises: generating a first-perspective top-down representation associated with the first image data; receiving second image data representing a second perspective of the environment at the first time; and generating a second-perspective top-down representation associated with the second image data; and wherein determining the estimated map data comprises combining the first-perspective top-down representation with the second-perspective top-down representation.

N. The method of any of paragraphs F-M, wherein the estimated map data is based on a first top-down representation associated with a first time instant and a second top-down representation associated with a second time instant; and wherein the machine learned model is trained at least in part on a cross-entropy loss based on the first top-down representation and the second top-down representation.

O. The method of any of paragraphs F-N, wherein the sensor data comprises image data, the estimated map data is first estimated map data, and the comparison is a first comparison, the method further comprising: receiving lidar data from a lidar sensor associated with the vehicle; determining second estimated map data based at least in part on the lidar data; comparing, as a second comparison, the second estimated map data to at least one of the stored map data or the trajectory data; and determining the operation of the vehicle further based at least in part on the second comparison.

P. The method of any of paragraphs F-O, wherein the determining the operations comprises at least one of remapping the environment or performing a different maneuver represented by an alternative proposed trajectory, which overlaps with portions of the estimated map data having higher confidence values.

Q. One or more non-transitory computer-readable media storing instructions that, when executed, cause one or more processors to perform operations comprising: receiving first sensor data and second sensor data from at least one sensor associated with a vehicle in an environment; determining, based at least in part on the first sensor data and on a first pose, a first top-down representation of the environment; determining, based at least in part on the second sensor data and a second pose, a second top-down representation of the environment; determining, based at least in part on the first top-down representation and a difference between the first pose and the second pose, a third top-down representation of the environment; determining, based on the second top-down representation and the third top-down representation, estimated map data; and determining, using the estimated map data, an operation of the vehicle.

R. The one or more non-transitory computer-readable media of paragraph Q, wherein the first sensor data comprises first image data and second image data; wherein the operations further comprise: generating a first-perspective top-down representation associated with the first image data; generating a second-perspective top-down representation associated with the second image data; and wherein generating the first top-down representation comprises combining the first-perspective top-down representation with the second-perspective top-down representation.

S. The one or more non-transitory computer-readable media of paragraph Q or R, wherein the operations further comprise: receiving at least one of stored map data or trajectory corridor data determined based at least in part on the stored map data; comparing, as a comparison, the estimated map data to at least one of the stored map data or the trajectory corridor data; and at least one of, based on the comparison, determining the operation of the vehicle, remapping the environment, or updating the stored map.

T. The one or more non-transitory computer-readable media of any of paragraphs Q-S, wherein the estimated map data is determined by inputting the first top-down representation and the third top-down representation into a machine learned model, which outputs the estimated map data and confidence value data associated with the estimated map data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving sensor data from a sensor associated with an autonomous vehicle in an environment, the sensor data comprising image data captured from a first perspective and lidar data captured from a second perspective;
inputting the sensor data to a machine learned model;
determining, by the machine learned model, lidar estimated map data representing the environment from a first top-down perspective and a first confidence value associated with the lidar estimated map data, wherein the first top-down perspective is different than the first perspective and the second perspective;
determining, by the machine learned model, image estimated map data representing the environment from a second top-down perspective and including a second confidence value;
receiving at least one of stored map data or trajectory corridor data determined based at least in part on the stored map data;
determining a first consistency score between the lidar estimated map data and the stored map data or trajectory corridor data;
determining a second consistency score between the image estimated map data and the stored map data or trajectory corridor data;
determining that the first consistency score meets or exceeds a first threshold and that the second consistency score meets or exceeds a second threshold; and
controlling an operation of the autonomous vehicle based at least in part on the first consistency score meeting or exceeding the first threshold, the second consistency score meeting or exceeding the second threshold, the first confidence value, and the second confidence value.

2. The system of claim 1, wherein the sensor data is first image data associated with a first time, and wherein determining the image estimated map data comprises:
determining, based on the first image data, a third top-down representation of the environment;
determining, based at least in part on second image data of the environment associated with a second time, a fourth top-down representation of the environment;
determining, based at least in part on the fourth top-down representation and a difference in a pose of the autonomous vehicle between the first time and the second time, a fifth top-down representation of the environment; and
determining the image estimated map data based on the third top-down representation and the fifth top-down representation.

3. The system of claim 1, wherein determining the second consistency score is based at least in part on:
an optical flow algorithm; and
determining a localization error.

4. The system of claim 1, wherein the operations further comprise:
receiving at least one of the stored map data or the trajectory corridor data comprises receiving the trajectory corridor data; and
determining an overlap score between a location associated with the lidar estimated map data and a corresponding location associated with the trajectory corridor data.

5. The system of claim 4, wherein the overlap score is further based at least in part on the first confidence value.

6. A method comprising:
receiving sensor data from a sensor associated with an autonomous vehicle in an environment, the sensor data being captured from a sensor perspective;
inputting the sensor data to a machine learned model;
receiving, from the machine learned model and based on inputting the sensor data into the machine learned model, first estimated map data representing a top-down representation of the environment and a confidence value associated with the first estimated map data, wherein the top-down representation is from a different perspective than the sensor perspective and the first estimated map data comprises one or more of roads or traffic control signals;
receiving at least one of stored map data or trajectory data determined based at least in part on the stored map data;
determining a first consistency score between the first estimated map data and the stored map data or trajectory corridor data;
determining a second consistency score between second estimated map data and the stored map data or trajectory corridor data;
determining that the first consistency score meets or exceeds a first threshold and that the second consistency score meets or exceeds a second threshold; and
determining an operation of the autonomous vehicle based at least in part on the first consistency score meeting or exceeding the first threshold and the second consistency score meeting or exceeding the second consistency score.

7. The method of claim 6, wherein the sensor data is first image data associated with a first time, and wherein determining the first estimated map data comprises:
determining, based on the first image data, a first top-down representation of the environment;
determining, based at least in part on second image data of the environment associated with a second time, a second top-down representation of the environment;
determining, based at least in part on the second top-down representation and a difference in a pose of the autonomous vehicle between the first time and the second time, a third top-down representation of the environment; and
determining the first estimated map data based on the first top-down representation and the third top-down representation.

8. The method of claim 6, wherein determining the first consistency score is based at least in part on:
an optical flow algorithm; and
the method further comprises determining a localization error.

9. The method of claim 6, further comprising:
receiving at least one of the stored map data or the trajectory data comprises receiving the trajectory data; and
determining an overlap score between a location associated with the first estimated map data and a corresponding location associated with the trajectory data.

10. The method of claim 9, wherein the overlap score is further based at least in part on the confidence value, which includes a per-pixel confidence value associated with the location.

11. The method of claim 9, wherein the location associated with the first estimated map data comprises at least one of off-road data, on-road data, solid lane-line data, or dash lane-line data.

12. The method of claim 9,
wherein the overlap score is a first overlap score; and
wherein the determining the first consistency score comprises:
determining a second overlap score between a second location associated with the first estimated map data and a corresponding second location associated with the trajectory data, and
combining the first overlap score and the second overlap score.

13. The method of claim 6,
wherein the sensor data is first image data representing a first perspective of the environment at a first time;
wherein the method further comprises:
generating a first-perspective top-down representation associated with the first image data;
receiving second image data representing a second perspective of the environment at the first time; and
generating a second-perspective top-down representation associated with the second image data; and
wherein determining the first estimated map data comprises combining the first-perspective top-down representation with the second-perspective top-down representation.

14. The method of claim 6,
wherein the first estimated map data is based on a first top-down representation associated with a first time instant and a second top-down representation associated with a second time instant; and
wherein the machine learned model is trained at least in part on a cross-entropy loss based on the first top-down representation and the second top-down representation.

15. The method of claim 6, wherein the sensor data comprises image data, the first estimated map data is first estimated map data, the method further comprising:
receiving lidar data from a lidar sensor associated with the autonomous vehicle;
determining second estimated map data based at least in part on the lidar data;
comparing, as a comparison, the second estimated map data to at least one of the stored map data or the trajectory data; and
determining the operation of the autonomous vehicle further based at least in part on the comparison.

16. The method of claim 6, wherein determining the operation comprises at least one of remapping the environment or performing a different maneuver represented by an alternative proposed trajectory, which overlaps with portions of the first estimated map data having higher confidence values.

17. One or more non-transitory computer-readable media storing instructions that, when executed, cause one or more processors to perform operations comprising:
receiving first sensor data and second sensor data from at least one sensor associated with an autonomous vehicle in an environment, wherein the first sensor data is captured from a first perspective and the second sensor data is captured from a second perspective;
determining, based at least in part on the first sensor data and on a first pose, a first top-down representation of the environment;
determining, based at least in part on the second sensor data and a second pose, a second top-down representation of the environment;
determining, based at least in part on the first top-down representation and a difference between the first pose and the second pose, a third top-down representation of the environment, wherein the third top-down representation is from a different perspective than the first perspective or the second perspective;
determining, based on the second top-down representation and the third top-down representation, image estimated map data, wherein the image estimated map data comprises policy information associated with a rule of a road within the environment;
determining, by a machine learned model, lidar estimated map data;
receiving at least one of stored map data or trajectory corridor data determined based at least in part on the stored map data;
determining a first consistency score between the lidar estimated map data and the stored map data or trajectory corridor data;
determining a second consistency score between the image estimated map data and the stored map data or trajectory corridor data;
determining that the first consistency score meets or exceeds a first threshold and that the second consistency score meets or exceeds a second threshold; and
determining an operation of the autonomous vehicle based on the first consistency score meeting or exceeding the first threshold, the second consistency score meeting or exceeding the second threshold.

18. The one or more non-transitory computer-readable media of claim 17,
wherein the first sensor data comprises first image data and second image data;
wherein the operations further comprise:
generating a first-perspective top-down representation associated with the first image data;
generating a second-perspective top-down representation associated with the second image data; and
wherein generating the first top-down representation comprises combining the first-perspective top-down representation with the second-perspective top-down representation.

19. The one or more non-transitory computer-readable media of claim 17, wherein the operations further comprise:
at least one of determining the operation of the autonomous vehicle, remapping the environment, or updating the stored map data.

20. The one or more non-transitory computer-readable media of claim 17, wherein the lidar estimated map data is determined by inputting the first top-down representation and the third top-down representation into the machine learned model, which outputs the lidar estimated map data and confidence value data associated with the lidar estimated map data.

* * * * *